(12) United States Patent
Merkel

(10) Patent No.: US 8,377,370 B2
(45) Date of Patent: *Feb. 19, 2013

(54) FINE POROSITY LOW-MICROCRACKED CERAMIC HONEYCOMBS AND METHODS THEREOF

(75) Inventor: Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/718,681

(22) Filed: Mar. 5, 2010

(65) Prior Publication Data

US 2010/0156010 A1   Jun. 24, 2010

Related U.S. Application Data

(63) Continuation of application No. 11/986,958, filed on Nov. 27, 2007, now Pat. No. 7,704,296.

(51) Int. Cl.
| | |
|---|---|
| B28B 1/00 | (2006.01) |
| B28B 3/00 | (2006.01) |
| B28B 5/00 | (2006.01) |
| C04B 33/32 | (2006.01) |
| C04B 33/36 | (2006.01) |
| C04B 35/64 | (2006.01) |

(52) U.S. Cl. ........... 264/631; 501/80; 264/630; 428/593
(58) Field of Classification Search .................. 264/628; 501/80, 120, 127, 133, 153, 154, 128, 121; 428/613, 593, 116, 117; 55/523
See application file for complete search history.

(56) References Cited

U.S. PATENT DOCUMENTS

| | | | | |
|---|---|---|---|---|
| 6,210,626 | B1 * | 4/2001 | Cornelius et al. | 264/631 |
| 6,287,510 | B1 * | 9/2001 | Xun | 264/630 |
| 6,391,813 | B1 * | 5/2002 | Merkel | 501/119 |
| 6,864,198 | B2 | 3/2005 | Merkel | 501/80 |
| 7,141,089 | B2 | 11/2006 | Beall et al. | 55/523 |
| 7,179,316 | B2 | 2/2007 | Merkel et al. | 55/523 |
| 2005/0069469 | A1 | 3/2005 | Fu et al. | 422/177 |
| 2007/0119133 | A1 | 5/2007 | Beall et al. | 55/523 |
| 2008/0004171 | A1 | 1/2008 | Melscoet-Chauvel et al. | 501/119 |
| 2008/0032090 | A1 | 2/2008 | Beall et al. | 428/116 |
| 2008/0032091 | A1 | 2/2008 | Beall et al. | 428/116 |
| 2008/0047243 | A1 | 2/2008 | Beall et al. | 55/523 |
| 2008/0057267 | A1 | 3/2008 | Brocheton et al. | 428/116 |

FOREIGN PATENT DOCUMENTS

| | | |
|---|---|---|
| EP | 0 894 776 | 2/1999 |
| EP | 1 184 066 | 5/2004 |
| WO | WO2004/002608 | 1/2004 |
| WO | WO2008/005291 | 1/2008 |
| WO | WO2008/027270 | 3/2008 |
| WO | WO2008/027422 | 3/2008 |
| WO | WO2009-005679 | 1/2009 |

OTHER PUBLICATIONS

U.S. Appl. No. 11/823,580, filed Jun. 28, 2007, Y. Brocheton et al.

* cited by examiner

*Primary Examiner* — Kaj K Olsen
*Assistant Examiner* — Pritesh Darji
(74) *Attorney, Agent, or Firm* — John L. Haack

(57) ABSTRACT

Disclosed are high-porosity cordierite honeycomb substrates having fine pore size, narrow pore size distribution, little or no microcracking, and a high thermal shock resistance. The porous ceramic honeycomb substrates generally include a primary cordierite ceramic phase as defined herein. Also disclosed are methods for making and using the cordierite substrates.

3 Claims, 5 Drawing Sheets

FINE POROSITY LOW-MICROCRACKED CERAMIC HONEYCOMBS AND METHODS THEREOF

CROSS-REFERENCE TO RELATED APPLICATIONS

This application is a continuation of and claims the benefit of priority to U.S. patent application Ser. No. 11/986958, filed on Nov. 27, 2007 now U.S. Pat. No. 7,704,296, the content of which is relied upon and incorporated herein by reference in its entirety.

BACKGROUND

The disclosure relates to porous honeycomb ceramics and methods of making, and more particularly to porous cordierite honeycomb ceramics useful in catalytic converters and particulate filters, such as for engine exhaust after-treatment.

SUMMARY

The disclosure provides a high-porosity cordierite honeycomb substrate or diesel particulate filters having fine pore size which substrates or filters have little or no microcracking and can maintain a high thermal shock resistance even with an increased coefficient of thermal expansion that is expected in the absence of microcracking.

The disclosure provides honeycomb bodies that have improved strength that makes them excellent choices for the fabrication of catalytic converter substrates or diesel particulate filters (DPFs) having very thin walls, together with, if desired, low cell densities for reduced back pressure and reduced thermal mass (faster light-off). The improved strength can also enable the manufacture of ceramic bodies having higher porosities for use in converter substrates and DPFs for further reduction in thermal mass or for storage of high amounts of catalyst (such as for SCR or 4-way catalyzed DPFs) while maintaining adequate strength. The fine median pore size of the inventive honeycomb bodies promotes high strength, and can additionally provide high filtration efficiency in DPFs, yielding articles having improved filtration of very fine particles during the early stages of soot deposition.

In embodiments, the porous ceramic honeycomb bodies generally comprise a primary cordierite ceramic phase and have a porosity % P of at least 50%; a median pore size diameter $d_{50}$ less than 10.0 microns; a thermal shock parameter (TSP) of at least 450° C.; and an elastic modulus E-ratio, $E_{900° C.}/E_{25° C.}$, of not more than 1.01. Thermal shock parameter TSP is defined as $(MOR_{25° C.}/E_{25° C.})(CTE_{500-900° C.})^{-1}$, $MOR_{25° C.}$ is the four-point modulus of rupture strength at 25° C., $E_{25° C.}$ is the Young's elastic modulus at 25° C., $E_{900° C.}$ is the elastic modulus measured at 900° C. during heating, and $CTE_{500-900° C.}$ is a high temperature thermal expansion coefficient at 500° C. to 900° C.

In embodiments, the disclosure also provides a method for making the porous ceramic honeycomb structures described herein. The method generally comprises mixing inorganic raw materials, an organic binder, and a liquid vehicle to form a plasticized batch, forming a green body from the plasticized batch, drying the green body, and firing the body to provide the cordierite ceramic structure.

Additional embodiments of the disclosure will be set forth, in part, in the detailed description, and any claims which follow, or can be learned by practice of the disclosure. The foregoing general description and the following detailed description are exemplary and explanatory only and are not restrictive.

BRIEF DESCRIPTION OF THE DRAWINGS

The accompanying drawings illustrate certain embodiments of the disclosure.

DETAILED DESCRIPTION

Figure 1:
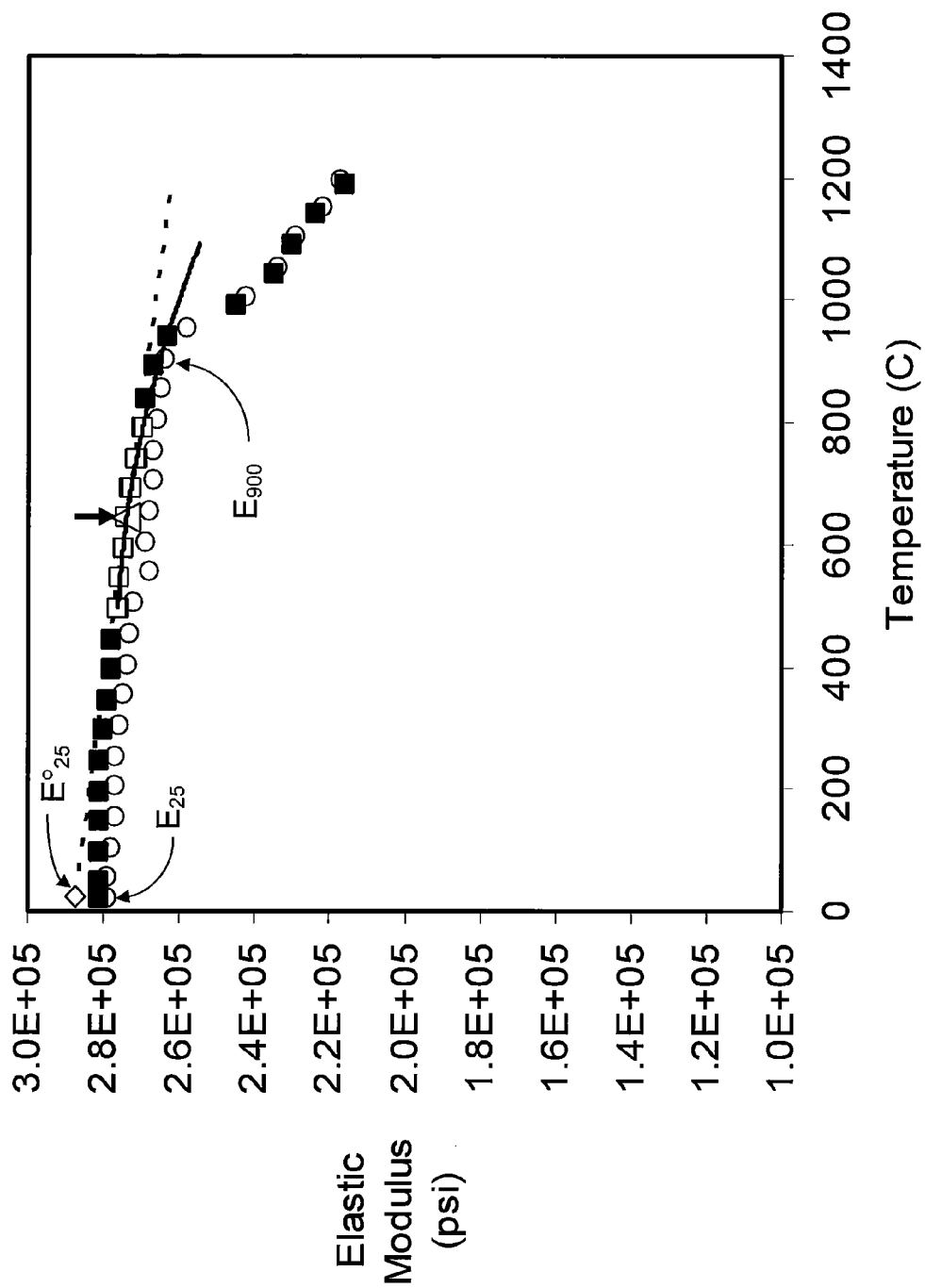
FIG. 1 is a plot of the elastic modulus (psi) versus temperature (° C.) during heating and cooling of an inventive low microcracked cordierite honeycomb body.

Various embodiments of the disclosure will be described in detail with reference to drawings, if any. Reference to various embodiments does not limit the scope of the disclosure, which is limited only by the scope of the claims attached hereto. Additionally, any examples set forth in this specification are not limiting and merely set forth some of the many possible embodiments for the claimed invention.

Disclosed are materials, compounds, compositions, and components that can be used for, can be used in conjunction with, can be used in preparation for, or are products of the disclosed method and compositions. These and other materials are disclosed herein, and when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including any components of the compositions and steps in methods of making and using the disclosed compositions. Thus, if there are a variety of additional steps that can be performed each of these additional steps can be performed with any specific embodiment or combination of embodiments of the disclosed methods, and that each such combination is specifically contemplated and should be considered disclosed.

Porous cordierite ceramic honeycomb structures having high thermal shock resistance and a fine pore size are useful for pollution control devices such as catalytic converter substrates, SCR substrates, and certain diesel particulate filters (DPFs). In these applications, porosity in the substrate provides a means to "anchor" the washcoat or catalyst onto the surface, or within the interior, of the channel walls, and serves to filter fine particulates from the exhaust gas in the case of DPFs. Historically, high thermal shock resistance in cordierite honeycomb ceramics has been achieved by maintaining a low coefficient of thermal expansion (CTE) which, in turn, is attained through microcracking and textural orientation of the cordierite crystals with their negative thermal expansion z-axes (also referred to as c-axes) oriented within the plane of the wall of the honeycomb. In a further effort to maintain a low coefficient of thermal expansion, previous approaches have also emphasized the use of high-purity raw materials low in sodium, potassium, calcium, iron, etc., in order to minimize the presence of secondary phases, especially a glass phase.

Recent trends in exhaust after-treatment for gasoline engines have placed greater demands on the catalytic converters. Specifically, converters with lower mass per unit volume are desired because such converters will heat up faster and begin catalytic conversion of the exhaust sooner, thereby resulting in lower overall emission of pollutants during a driving cycle. Lower mass can be achieved by any combination of lower cell density, thinner walls, or higher porosity, all of which may reduce the strength of the converter substrate. Achieving high strength in low-mass cordierite honeycombs remains a challenge because the presence of microcracks, which are necessary for very low CTE, may also reduce the strength of the ceramic. In DPFs, higher porosity is also often desired in cases where the DPF is catalyzed. This higher porosity similarly may lower the strength of the DPF.

A second challenge faced by catalyzed substrates or DPFs comprised of a microcracked cordierite ceramic is penetration of very fine catalyst washcoat particles into the microcracks within the cordierite matrix, or precipitation of dissolved components from the washcoat and catalyst system in the microcracks. In DPFs, it is also possible for ash or soot particles to enter the microcracks. The presence of particles within the microcracks may interfere with the closing of the microcracks during heating, essentially pillaring the cracks open. This may result in an increase in the coefficient of thermal expansion (CTE) and may also cause an increase in elastic modulus (E), both factors which may contribute to a reduced thermal shock resistance.

Although previous efforts at improving thermal shock resistance have focused on reducing the coefficient of thermal expansion, the thermal shock resistance of a ceramic material can also be improved by increasing the ratio of the strength (such as measured by the modulus of rupture) to Young's elastic modulus, MOR/E. The quantity MOR/E is also known as the strain tolerance of the ceramic.

In embodiments, the disclosure provides a high-porosity cordierite honeycomb substrate or DPF with fine pore size that exhibits little or no microcracking and maintains a high thermal shock resistance even with an increase in the coefficient of thermal expansion that occurs in the absence of microcracking. Such a substrate exhibits improved strength, and also possesses a thermal shock resistance that is less sensitive to the presence of the washcoat and catalyst.

"Include," "includes," or like terms means including but not limited to.

The singular forms "a," "an," and "the" include plural referents unless the context clearly dictates otherwise. Thus, for example, reference to a "component" includes embodiments having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the disclosure includes both embodiments including and excluding the component.

Ranges can be expressed herein as from "about" one particular value, to "about" another particular value, or "about" both values. When such a range is expressed, another embodiment includes from the one particular value, to another particular value, or both. Similarly, when values are expressed as approximations, by use of the antecedent "about," the particular value forms another embodiment. The endpoints of each of the ranges are significant both in relation to the other endpoint, and independently of the other endpoint.

"Weight percent," "wt. %," "percent by weight" or like terms referring to, for example, a component, unless specifically stated to the contrary, refers to the ratio of the weight of the component to the total weight of the composition in which the component is included, expressed as a percentage.

In embodiments, the porous ceramic honeycomb bodies exhibit relatively high levels of porosity. For example, the ceramic honeycomb bodies of the disclosure can have a total porosity % P≧45% such as a total porosity (% P) of the porous body of at least 45%, at least 50%, and at least 55%. Additionally or alternatively, the ceramic honeycomb bodies of the disclosure can have a total porosity % P≧52%, % P≧55%, or even % P≧58%. In embodiments, the ceramic honeycomb bodies of the disclosure can have a % P≧60% or even % P≧65%.

In embodiments, the high total porosity can preferably be comprised of a network of interconnected pores having relatively fine pore sizes and a relatively narrow pore size distribution. In embodiments, the fine pore size can be characterized by a median pore diameter ($d_{50}$) that does not exceed 10 microns. For example, the median pore diameter can be in the range of about 1-10 μm. In embodiments, the median pore diameter $d_{50}$ can be less than about 8 μm, less than 7 μm, less than 6 μm, less than 5 μm, or even less than about 4 μm. In a preferred embodiment, the median pore diameter can be less than about 7.9 μm.

A narrow pore size distribution can provide low soot-loaded pressure drop and can enable high filtration efficiency when the body is used as a particulate filter. The relative narrowness of the pore size distribution of the porosity of the porous body of the disclosure can be characterized by a calculation of $d_f$ or $d_b$, wherein $d_f=(d_{50}-d_{10})/d_{50}$ and $d_b=(d_{90}-d_{10})/d_{50}$. The parameters $d_{10}$, $d_{50}$, and $d_{90}$ in these equations are conventionally used and defined herein as the pore diameters at which 10%, 50%, and 90%, respectively, of the pore volume of the material resides in pores of smaller pore diameter, as measured by standard mercury porosimetry. Thus, $d_{10}<d_{50}<d_{90}$ in these measurements. In embodiments, values for $d_f$ can include, for example, $d_f \leq 0.55$, $d_f \leq 0.50$, $d_f \leq 0.45$, $d_f \leq 0.40$, $d_f \leq 0.37$, $d_f \leq 0.35$, and even $d_f \leq 0.30$.

As noted above, the narrow pore size distribution can also be characterized by the overall breadth of the pore size distribution as defined by the equation $d_b=(d_{90}-d_{10})/d_{50}$. For example, values of $d_b$ can include $d_b \leq 1.50$, $d_b \leq 1.20$, $d_b \leq 1.00$, $d_b \leq 0.90$, or even $d_b \leq 0.80$.

The durability of the disclosed ceramic articles under thermal shock conditions can also be characterized by the calculation of a thermal shock parameter (TSP). More specifically, TSP is an indicator of the maximum temperature difference a body can withstand without fracturing when the coolest region of the body is at about 500° C. Thus, for example, a calculated TSP of about 450° C. implies that the maximum temperature at some position within the honeycomb body must not exceed 950° C. when the coolest temperature at some other location within the body is 500° C. The thermal shock parameter is calculated according to the equation TSP=$(MOR_{25°\ C.}/E_{25°\ C.})(CTE_{500-900°\ C.})^{-1}$ wherein $MOR_{25°\ C.}$ is the modulus of rupture strength at 25° C., $E_{25°\ C.}$ is the Young's elastic modulus at 25° C., and $CTE_{500-900°\ C.}$ is the mean thermal expansion coefficient from 500° C. to 900° C.

The modulus of rupture, MOR, is measured by the four-point method on a cellular bar, such as either about 0.5×1.0×5.0 inches or about 0.25×0.5×2.5 inches, whose length is parallel to the channels of the honeycomb. The MOR is a measure of the flexural strength of the honeycomb body. A high value of MOR is desired because this corresponds to greater mechanical durability of the body and higher thermal durability and thermal shock resistance. A high value of MOR also yields higher values for the thermal shock parameter, $(MOR_{25°\ C.}/E_{25°\ C.})(CTE_{500-900°\ C.})^{-1}$.

The elastic modulus (Young's modulus), E, is measured by a sonic resonance technique in which the specimen is a 0.5×1.0×5.0 inch bar and in which the length of the bar is parallel to the length of the channels. The elastic modulus is a measure of the rigidity of the body. A low value of E is desired because this corresponds to greater flexibility of the body and higher thermal durability and thermal shock resistance. A low value of E also yields higher values for the thermal shock parameter, $(MOR_{25°\ C.}/E_{25°\ C.})(CTE_{500-900°\ C.})^{-1}$.

The coefficient of thermal expansion, CTE, is measured by dilatometry along the axial direction of the specimen, which is the direction parallel to the lengths of the honeycomb channels. As noted above, the value of $CTE_{500-900°\ C.}$ is the mean coefficient of thermal expansion from 500 to 900° C. Similarly, the value of $CTE_{25-800°\ C.}$ is the mean coefficient of thermal expansion from 25 to 800° C., and the value of $CTE_{200-1000°\ C.}$ is the mean coefficient of thermal expansion from 200 to 1000° C., all as measured during heating of the sample. A low value of CTE is desired for high thermal durability and thermal shock resistance. A low value of CTE yields higher values for the thermal shock parameter, $(MOR_{25°\ C.}/E_{25°\ C.})(CTE_{500-900°\ C.})^{-1}$. In embodiments, the $CTE_{500-900°\ C.}$ is preferably not more than $23 \times 10^{-7}$/° C., $22 \times 10^{-7}$/° C., $21 \times 10^{-7}$/° C., $20 \times 10^{-7}$/° C., and even not more than $19 \times 10^{-7}$/° C.

In embodiments of the disclosure, it is preferred that the thermal shock parameter values of the honeycomb bodies be TSP≧450° C., TSP≧500° C., TSP 525° C., TSP≧550° C., and even TSP≧600° C. In embodiments, the thermal shock parameter values can be TSP≧700° C., TSP≧800° C., and even TSP≧900° C. From these exemplary TSP values in embodiments of the disclosure, the Thermal Shock Limit (TSL) of ceramic honeycomb bodies can be calculated. As noted above, the thermal shock limit is conventionally considered to be the maximum temperature to which the center of the body can be heated when the surface of the body is 500° C., without suffering cracking damage. TSL can be estimated by adding 500° C. to the value of Thermal Shock Parameter (TSP) as according to TSL=TSP+500° C.

Figure 5:
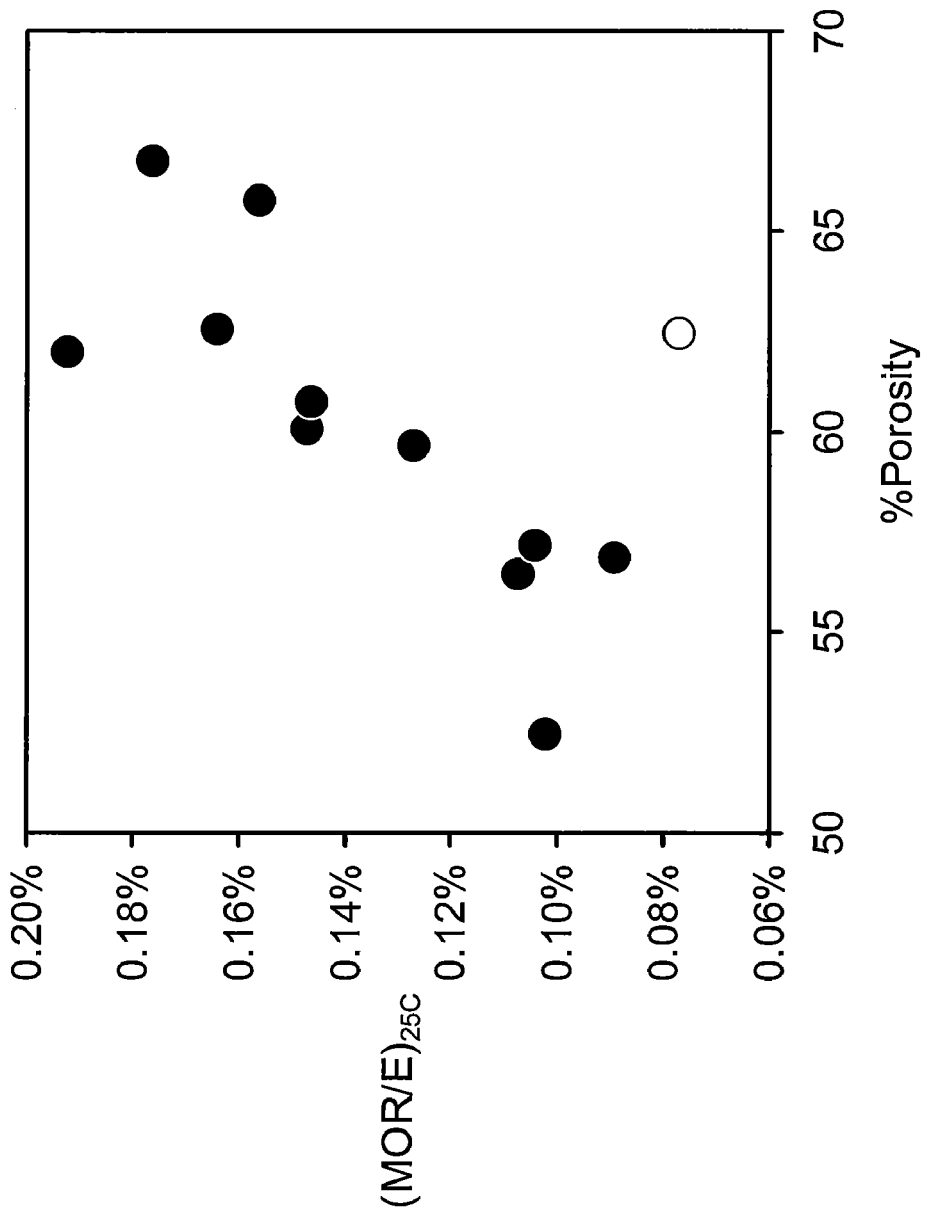
FIG. 5 is a plot of strain tolerance, $(MOR/E)_{25° C.}$, versus the % porosity for inventive low microcracked cordierite embodiments of the disclosure (filled circles) and an inferior example having low $(MOR_{25° C.}/E_{25° C.})$ and intermediate porosity (open circle).

In embodiments, a large proportion of highly interconnected pores have a narrow pore size distribution of the cordierite honeycomb bodies and may contribute importantly to the high strain tolerance and high TSP values obtained. High pore interconnectivity in these low microcracked ceramics has the effect of reducing elastic modulus values to a greater extent than MOR values. Thus, the ratio strain tolerance $(MOR_{25°\ C.}/E_{25°\ C.})$ also denoted $(MOR/E)_{25°\ C.}$, upon which the TSP value depends, is favorably impacted by the amount of porosity of these low microcracked ceramics (FIG. 5). In embodiments, a relatively high ratio of $(MOR/E)_{25°\ C.}$ is provided, where $(MOR/E)_{25°\ C.}≧0.10\%$, $(MOR/E)_{25°\ C.}≧0.11\%$, $(MOR/E)_{25°\ C.}≧0.12\%$, $(MOR/E)_{25°\ C.}≧0.13\%$, $(MOR/E)_{25°\ C.}≧0.14\%$, $(MOR/E)_{25°\ C.}≧0.15\%$, $(MOR/E)_{25°\ C.}≧0.16\%$, or even $(MOR/E)_{25°\ C.}≧0.17\%$.

In embodiments of the disclosure, the porous cordierite ceramic honeycomb contains a rare earth metal oxide. The rare earth metal oxide is preferably present in an amount from 0.25 to 4.0 weight percent of the ceramic body, and more preferably from 0.5 to 3.0 weight percent, and even more preferably from 0.7 to 2.0 weight percent. The rare earth oxide is preferably yttrium or lanthanum oxide. It is further preferred that the rare earth oxide be present, at least in part, in a glass phase within the microstructure of the ceramic. It has been discovered that the presence of a rare earth oxide serves to improve the strength of the body and to reduce microcracking.

The honeycomb bodies of the disclosure can possess a microstructure in which the cordierite crystallites are randomly oriented or, alternatively, in which they are preferentially oriented with their negative-CTE crystallographic z-axes parallel to the plane of the honeycomb wall. A high degree of such orientation can be desirable because it reduces the CTE of the honeycomb article in both the axial direction (within the plane of the wall, parallel to the lengths of the channels) and radial direction (within the plane of the wall, orthogonal to the lengths of the channels). The degree of preferred crystal orientation is measured by x-ray diffractometry on a specimen cut from the fired body. An "XRD I-ratio" is defined by the relation of EQ. 1

$$I\text{-ratio}=I(110)/[I(110)+I(002)] \qquad \text{EQ. 1}$$

where I(110) and I(002) are the peak heights of the XRD reflections from the (110) and (002) planes in the cordierite crystal lattice, based upon hexagonal indexing of the XRD peaks, using copper Kα radiation. The "axial I-ratio," $I_A$, is measured by x-ray diffractometry on the axial cross section of the honeycomb, that is, the cross section orthogonal to the length of the channels. The "transverse I-ratio," $I_T$, is measured on the as-fired surface of the honeycomb wall, with the orthogonal walls removed. The "powder I-ratio" is measured on powder prepared by pulverizing the honeycomb specimen to a fine particle size. The value of the powder I-ratio also represents the I-ratio for randomly oriented cordierite crystals and is about 0.655.

Near-random orientations are exemplified by cordierite crystallites in walls of the honeycomb structure having a $Δ_I≦0.1$ wherein $Δ_I=I_T-I_A$. In contrast, cordierite crystallites in walls of the low-microcracked honeycomb structure of the disclosure which have a preferred orientation can have a $Δ_I>0.1$. In embodiments, in porous ceramic honeycomb, the walls of the honeycomb structure including a preferred orientation can have an $I_A≦0.60$, an $I_A≦0.55$, an $I_A≦0.50$, or even an $I_A≦0.45$. Furthermore, the walls of the honeycomb structure can have an $I_T≧0.70$, an $I_T≧0.75$, an $I_T≧0.80$, or even an $I_T≧0.85$. In embodiments, the low-microcracked honeycomb structures of the disclosure which exhibit preferred orientation can have a $Δ_I≧0.2$, a $Δ_I≧0.3$, a $Δ_I≧0.4$ or even a $Δ_I≧0.45$.

To preserve good thermal shock resistance, the average coefficient of thermal expansion of the cordierite ceramic honeycomb body over the 25° C.-800° C. (hereinafter the CTE) should be relatively low. Accordingly, a $CTE≦18.0 \times 10^{-7}$/° C. along at least one direction in the ceramic body may be exhibited in embodiments of the disclosure. In embodiments, a $CTE≦16.0 \times 10^{-7}$/° C., or even a $CTE≦14.0 \times 10^{-7}$/° C. along at least one direction are provided. In embodiments of the low-microcracked honeycombs, the coefficient of thermal expansion of the cordierite ceramic honeycomb body along at least one direction over the temperature range can have a CTE$\leqq 12.0\times 10^{-7}/°$ C., or even a CTE$\leqq 11.0\times 10^{-7}/°$ C. In embodiments, a CTE in the range of about $10.5\times 10^{-7}/°$ C. to about $18.0\times 10^{-7}/°$ C. can be provided, including for example a CTE in the range of from about $10.5\times 10^{-7}/°$ C. to about $14.0\times 10^{-7}/°$ C. In embodiments, a preferred orientation of the cordierite crystallites includes having their z-axes parallel to the plane of the wall whereby $\Delta_T$>0.10, and a CTE$\leqq 14.0\times 10^{-7}/°$ C. In embodiments a preferred orientation of the cordierite crystallites includes having their z-axes parallel to the plane of the wall. In embodiments it is also preferred that the CTE is at least $10.5\times 10^{-7}/°$ C. because such CTE values are associated with a low degree of microcracking. For this reason, it is further preferred that the CTE$\geqq 12.0\times 10^{-7}/°$ C. In alternative embodiments where the orientation of the cordierite crystallites within the wall is nearly random, such that $\Delta_T \leqq 0.10$, the CTE can be from about $14.0\times 10^{-7}/°$ C. to about $18.0\times 10^{-7}/°$ C.

The above values of CTE for the cordierite ceramic bodies can also be affected by, for example, the degree of microcracking, the extent of crystallite orientation (microstructural texturing) with respect to the plane of the wall or the extrusion direction, and the amount of crystalline secondary phases such as spinel, sapphirine, mullite, and alumina (corundum). Accordingly, it has been discovered that the degree to which the value of $CTE_{25\text{-}800°\ C.}$ is reduced by microcracking, $\Delta CTE_{mc}$, can be estimated by EQ. 2 or EQ. 3:

$$\Delta CTE_{mc}(I_T)=\{34-26(I_T)\}+0.6(\%\ SCP)-CTE_{25\text{-}800°\ C.} \quad \text{EQ. 2}$$

$$\Delta CTE_{mc}(I_A)=\{76.838(I_A)^3-129.5(I_A)^2+97.915(I_A)-12.8\}+0.6(\%\ SCP)-CTE_{25\text{-}800°\ C.} \quad \text{EQ. 3}$$

In EQ. 2 and EQ. 3, $I_T$ and $I_A$ are the transverse and axial XRD I-ratios, as defined above, % SCP is the total of the weight percentages of the secondary crystalline phases in the fired ceramic body as measured by powder x-ray diffractometry (XRD), equal to wt % spinel+wt % sapphirine+wt % mullite+wt % corundum; $CTE_{25\text{-}800°\ C.}$ is the measured coefficient of thermal expansion as defined above in units of $10^{-7}/°$ C.; and $\Delta CTE_{mc}(I_T)$ and $\Delta CTE_{mc}(I_A)$ are in units of $10^{-7}/°$ C. Thus, for example, if the measured $CTE_{25\text{-}800°\ C.}$ is $12.0\times 10^{-7}/°$ C., a value of "12.0" is entered into EQ. 2 and EQ. 3. Likewise, for example, if a value of "1.5" is computed from the right side of EQ. 2 or EQ. 3, it is meant that the value of $\Delta CTE_{mc}(I_T)$ or $\Delta CTE_{mc}(I_A)$ is $1.5\times 10^{-7}/°$ C.

Larger (more positive) values of $\Delta CTE_{mc}(I_T)$ and $\Delta CTE_{mc}(I_A)$ indicate greater amounts of microcracking. Values of $\Delta CTE_{mc}(I_T)$ or $\Delta CTE_{mc}(I_A)$ that approach zero correspond to a lower degree of microcracking. In some embodiments, the calculated value of $\Delta CTE_{mc}(I_T)$ or $\Delta CTE_{mc}(I_A)$ can even be slightly negative due to small contributions to CTE from other minor factors or due to small errors in the measured values of the I-ratio, % SCP, or $CTE_{25\text{-}800°\ C.}$. According to embodiments of the disclosure, the bodies can be characterized by a value of $\Delta CTE_{mc}(I_T)$ or a value of $\Delta CTE_{mc}(I_A)$ that is less than $3.0\times 10^{-7}/°$ C., more preferably less than $2.0\times 10^{-7}/°$ C., less than $1.5\times 10^{-7}/°$ C., or even less than $1.0\times 10^{-7}/°$ C.

The microcrack parameter $Nb^3$ and the E-ratio $E_{900°\ C.}/E_{25°\ C.}$ are measures of the level of microcracking in ceramic bodies, such as a cordierite ceramics. We have discovered that for a low-microcracked cordierite body, the elastic modulus gradually decreases with increasing temperature. This decrease in the elastic modulus is believed to be attributable to the increasing distance between atoms within the crystal structure with increasing temperature. An example of the decrease in elastic modulus with increasing temperature for a porous, non-microcracked cordierite honeycomb body is depicted in FIG. 1. FIG. 1 shows the elastic modulus versus temperature behavior for a non-microcracked cordierite honeycomb ceramic during heating to 1,200° C. (open circles) and cooling back to room temperature (filled and open squares). The near overlap of the heating and cooling trend lines signifies a virtual absence of microcracks. The elastic modulus decrease has been found to be essentially linear from room temperature to 900° C., or even to 1000° C. Above about 1,000° C., there is a greater rate of decrease in elastic modulus with increasing temperature. This is believed to be due to the softening, or even partial melting, of a small amount of residual glass phase that originally formed by reaction of impurities or glass-forming metal oxide additions during sintering of the ceramic. Surprisingly, the rate of change in the elastic modulus with heating for a non-microcracked cordierite ceramic, $\Delta E°/\Delta T$, was found to be proportional to the value of the elastic modulus of the non-microcracked body at room temperature, $E°_{25°\ C.}$, and is closely approximated by the relation of EQ. 4:

$$\Delta E°/\Delta T=-7.5\times 10^{-5}(E°_{25°\ C.}) \quad \text{EQ. 4}$$

where the superscript "°" elastic modulus term)(E°) denotes the elastic modulus of the ceramic in a non-microcracked state. For non-microcracked cordierite bodies, the temperature dependence of the elastic modulus during cooling after heating to a high temperature, such as 1,200° C., is essentially identical to the temperature dependence during the original heating, so that, at any given temperature, the value of the elastic modulus during cooling is nearly the same as its value at that temperature during heating. This is also illustrated in FIG. 1 for a low-microcracked cordierite ceramic.

Figure 2:
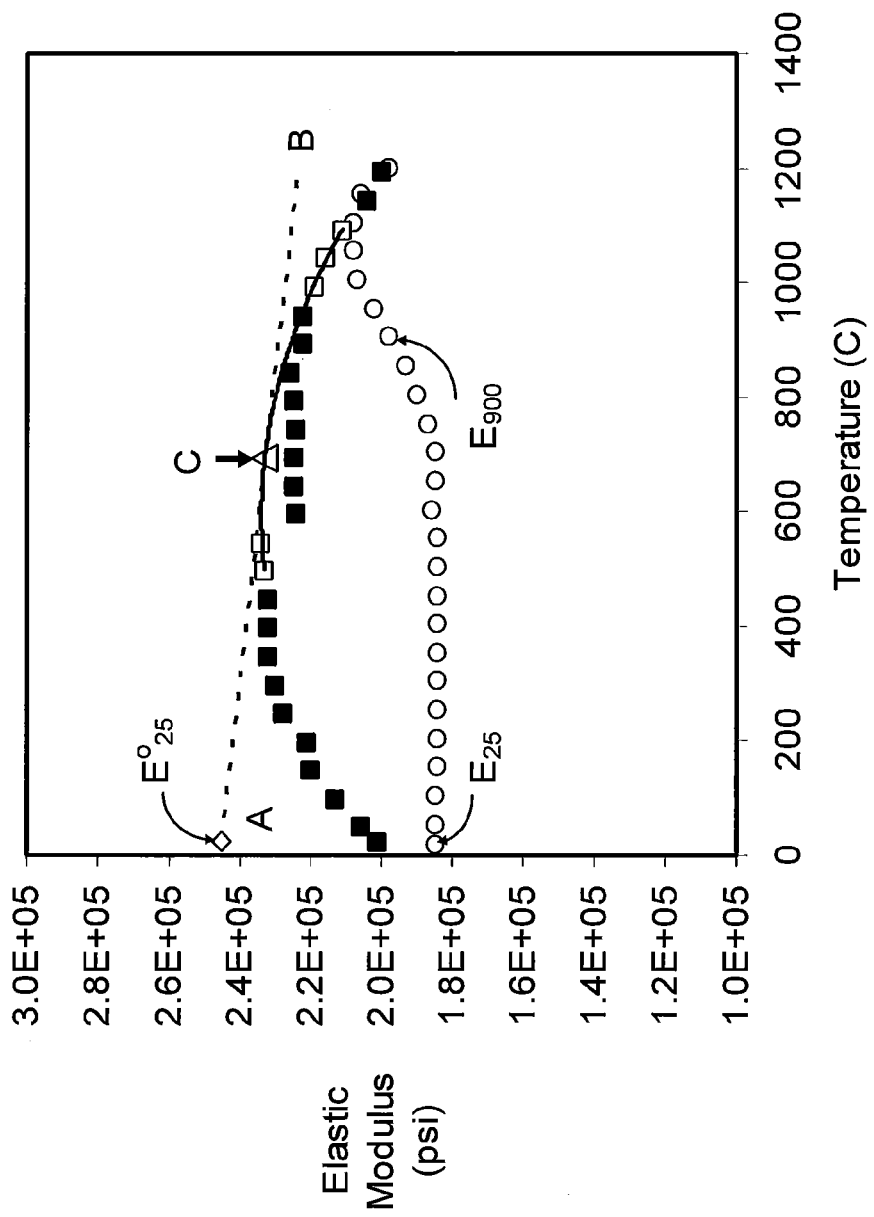
FIG. 2 is a plot of the elastic modulus (psi) versus temperature (° C.) during heating and cooling of a highly microcracked cordierite ceramic body.

An example of the temperature dependence of the elastic modulus for a highly microcracked cordierite ceramic body is displayed in FIG. 2. Thus, FIG. 2 shows the elastic modulus versus temperature behavior for a microcracked cordierite honeycomb ceramic during heating to 1,200° C. (open circles) and cooling back to room temperature (filled and open squares).

In a highly microcracked ceramic body, the elastic modulus increases gradually, and then more steeply, with increasing temperature up to 1,200° C. This increase is believed to be due to the re-closing, and eventual annealing, of the microcracks with heating, so that the ceramic body has progressively fewer open microcracks at higher temperatures. The increase in E due to the reduction in microcracking more than offsets the decrease in E of the individual cordierite crystallites with heating, resulting in a more rigid body at high temperature. As the ceramic is cooled from 1,200° C., the microcracks do not immediately re-open, because micro-stresses are initially too low. As a result, the trend in elastic modulus with cooling is initially that of a non-microcracked cordierite body. The increase is steep at first due to the increase in viscosity of any liquid or glass phase, possibly accompanied by a reduction in volume fraction of the liquid or glass due to crystallization or devitrification, respectively. Between about 1,000 and 700° C. in the example in FIG. 2, the more gradual increase in E with decreasing temperature can be ascribed to the natural increase in the elastic modulus of the cordierite crystals with cooling. At temperatures below about 700° C., the elastic modulus undergoes a gradual, then more rapid, decrease with cooling. This is due to the progressive re-opening of the microcracks and a decrease in the rigidity of the ceramic. At room temperature, the elastic modulus has returned to a value close to the initial value of the ceramic before the thermal cycle to 1,200° C.

The extent of microcracking in the cordierite ceramic is reflected in two features of the elastic modulus heating and cooling curves. One manifestation of the degree of microcracking is the extent to which the elastic modulus increases from 25° C. to 900° C. or to 1000° C. during heating, as this increase is believed to be caused by a re-closing of the microcracks. Based upon EQ. 4, one can calculate the ratio of the elastic modulus of a non-microcracked cordierite body at 900° C. or at 1,000° C. to that of a non-microcracked cordierite body at 25° C. as being $E°_{900° C.}/E°_{25° C.}=1+875(-7.5 \times 10^{-5})=0.934$ or $E°_{1000° C.}/E°_{25° C.}=1+975(-7.5 \times 10^{-5})=0.927$. These values of $E°_{900° C.}/E°_{25° C.}$ and $E°_{1000° C.}/E°_{25° C.}$ provide a baseline against which to compare the $E_{900° C.}/E_{25° C.}$ and $E_{1000° C.}/E_{25° C.}$ values of a microcracked ceramic body. For example, in FIG. 1, the ratio $E_{900° C.}/E_{25° C.}$ is 0.95 and the ratio $E_{1000° C.}/E_{25° C.}$ is 0.87, indicating a very low degree of microcracking. By contrast, in FIG. 2, the ratio of $E_{900° C.}/E_{25° C.}$ for the heating curve is 1.07 and $E_{1000° C.}/E_{25° C.}$ is 1.12. These values are much higher than would be expected in the complete absence of microcracking. Thus, the value of $E_{900° C.}/E_{25° C.}$ or $E_{1000° C.}/E_{25° C.}$ for a cordierite ceramic may be utilized as a quantitative measure of the extent of microcracking in the room-temperature body. Thus, according to embodiments of the disclosure $E_{900° C.}/E_{25° C.} \leq 1.00$, $E_{900° C.}/E_{25° C.} \leq 0.99$, $E_{900° C.}/E_{25° C.} \leq 0.98$, $E_{900° C.}/E_{25° C.} \leq 0.97$, $E_{900° C.}/E_{25° C.} \leq 0.96$, $E_{900° C.}/E_{25° C.} \leq 0.95$, and even $E_{900° C.}/E_{25° C.} \leq 0.94$. To that end, it should be noted that the minimum achievable value for $E_{900° C.}/E_{25° C.}$ for a ceramic comprised of 100% cordierite is about 0.93 when the body is entirely absent of microcracks. When a glass phase is also present in the cordierite ceramic body, the value of $E_{900° C.}/E_{25° C.}$ can be even less than 0.93 due to reduction in $E_{900° C.}$ by softening of the glass at high temperature.

Another indication of the degree of microcracking is the gap between the elastic modulus heating and cooling curves. A method to quantify this hysteresis is based upon the construction of a tangent to the cooling curve in a temperature region where the sample is still in a non-microcracked state. In FIG. 2, such a tangent is shown as line A-B, and the point of tangency is denoted by point "C". The slope of the tangent line is, therefore, equivalent to the temperature dependence of the elastic modulus of the non-microcracked cordierite body, as constrained by EQ. 4. Furthermore, the value of this tangent line extrapolated back to room temperature (point A) is approximately equivalent to the room-temperature elastic modulus of the sample if it were not microcracked at room temperature, and is equal to $E_{25° C.}$ for that sample. Thus, the equation of the tangent line is given by the following general expression of EQ. 5:

$$E°_{tangent}=(E°_{25° C.})\{1-7.5 \times 10^{-5}(T-25)\} \quad \text{EQ. 5}$$

Where $E°_{tangent}$ denotes the elastic modulus of the non-microcracked body at each temperature, T, along the tangent line.

An analytical method was devised for determining $E°_{25° C.}$ from the experimental measurements of the elastic modulus during cooling, after heating to about 1,200° C. In accordance with this method, a second-order polynomial is fit to the elastic modulus measurements made during cooling between about 1,000° C. and 500° C., as a function of temperature (° C.). This equation is of the following form:

$$E=c+b(T)+a(T^2) \quad \text{EQ. 6}$$

The upper limit of the temperature range over which the experimentally measured elastic modulus values are fit by EQ. 6 may be further restricted to a temperature less than 1000° C. if it is determined that the trend in E versus temperature exhibits a very high curvature at, or below, about 1000° C., due to, for example, the persistence of substantial softening of a glass phase or formation of a small amount of liquid below 1,000° C. Likewise, the lower limit of the temperature range over which the experimentally measured elastic modulus values are fit by EQ. 6 may be further restricted to a temperature greater than 500° C. if it is determined that the trend in E versus temperature exhibits a very high curvature at, or above, about 500° C., due to, for example, substantial reopening of the microcracks above 500° C. The method of least-squares regression analysis is used to derive the values of the regression coefficients "a," "b," and "c" in EQ. 6. In FIG. 2, the polynomial fit to the open squares is represented by the solid curve from 500 to 1,100° C.

The value of $E°_{25° C.}$ is obtained by solving for the elastic modulus and temperature at which the tangent line, given by EQ. 5, intersects the polynomial curve fit to the elastic modulus data during cooling, given by EQ. 6. The values of the elastic modulus and temperature at this point of intersection are denoted $E_i$ and $T_i$, respectively. In the example in FIG. 2, the values of $E_i$ and $T_i$ correspond to the triangle, point C. Because this point of intersection is common to both the tangent line and the polynomial curve, it follows that $$E_i=(E°_{25° C.})\{1-7.5 \times 10^{-5}(T_i-25)\}=c+b(T_i)+a(T_i^2) \quad \text{EQ. 7}$$

Also, at the point of tangency, the slope of the polynomial curve must equal that of the tangent line. Therefore, it follows that $$(E°_{25° C.})(-7.5 \times 10^{-5})=b+2a(T_i) \quad \text{EQ. 8}$$

EQ. 7 and EQ. 8 provide two equations relating the two unknown quantities, $E°_{25° C.}$ and $T_i$, to one another. To solve for $E°_{25° C.}$ and $T_i$, EQ. 8 is first rearranged to yield $$(E°_{25° C.})=\{b+2a(T_i)\}/(-7.5 \times 10^{-5}) \quad \text{EQ. 9}$$

EQ. 9 is then substituted into EQ. 7 to give the following expression:

$$\{\{b+2a(T_i)\}/(-7.5 \times 10^{-5})\}\{1-7.5 \times 10^{-5}(T_i-25)\}=c+b(T_i)+a(T_i^2) \quad \text{EQ. 10}$$

EQ. 10 may be rearranged to yield the following:

$$0=\{c+b(T_i)+a(T_i^2)\}-\{\{b+2a(T)\}/(-7.5 \times 10^{-5})\}\{1-7.5 \times 10^{-5}(T_i-25)\} \quad \text{EQ. 11}$$

Gathering terms in EQ. 11 gives the following relation:

$$0 = \{c - \{b/(-7.5 \times 10^{-5})\}\{1 + 7.5 \times 10^{-5}(25)\}\} + \\ (T_i)(b) - (T_i)\{2a/(-7.5 \times 10^{-5})\}\{1 + 7.5 \times 10^{-5}(25)\} - \\ (T_i)\{\{b/(-7.5 \times 10^{-5})\}\{-7.5 \times 10^{-5}\}\} + \\ (T_i^2)\{a - \{2a/(-7.5 \times 10^{-5})\}(-7.5 \times 10^{-5})\} \quad \text{EQ. 12}$$

Further simplifying EQ. 12 yields $$0=\{c-\{b/(-7.5\times10^{-5})\}\{1+7.5\times10^{-5}(25)\}\}+(T_i)\{-2a/(-7.5\times10^{-5})\}\{1+7.5\times10^{-5}(25)\}+(T_i^2)(-a) \quad \text{EQ. 13}$$

EQ. 13 may be re-expressed as $$0=C+B(T_i)+A(T_i^2) \quad \text{EQ. 14}$$

where $C=\{c-\{b/(-7.5\times10^{-5})\}\{1+7.5\times10^{-5}(25)\}\}$, $B=\{-2a/(-7.5\times10^{-5})\}\{1+7.5\times10^{-5}(25)\}$, and $A=-a$. The value of $T_i$ can then be found by solving the quadratic formula:

$$T_i=\{-B+\{B^2-4(A)(C)\}^{0.5}\}/2A \quad \text{EQ. 15}$$

$$T_i=\{B-\{B^2-4(A)(C)\}^{0.5}\}/2A \quad \text{EQ. 16}$$

EQ. 15 and EQ. 16 provide two possible values of $T_i$, of which only one will have a physically realistic value, that is, a value lying between 25 and 1,200° C. The physically realistic value of $T_i$ computed in this manner is then substituted into EQ. 9, from which the value of $E°_{25° C.}$ is calculated.

Once $E°_{25° C.}$ has been solved for, the ratio of the elastic modulus for the hypothetically non-microcracked sample at 25° C., $E°_{25° C.}$, to the actual measured value of the elastic modulus of the microcracked sample at 25° C., $E_{25° C.}$ is proportional to the degree of microcracking in the initial sample before heating. That is, a greater degree of microcracking at room temperature will lower the value of $E_{25° C.}$, and thereby raise the value of $E°_{25° C.}/E_{25° C.}$.

Modeling of the relationship between elastic modulus and microcracking has provided a relationship between the ratio $E°_{25° C.}/E_{25° C.}$ and the quantity $Nb^3$, where N is the number of microcracks per unit volume of ceramic and b is the diameter of the microcracks (see D. P. H. Hasselman and J. P. Singh, "Analysis of the Thermal Stress Resistance of Microcracked Brittle Ceramics," *Am. Ceram. Soc. Bull.*, 58 (9) 856-60 (1979).) Specifically, this relationship may be expressed by the following equation:

$$Nb^3 = (9/16)\{(E°_{25° C.}/E_{25° C.}) - 1\} \quad \text{EQ. 17}$$

Although based upon a number of simplifying assumptions, the quantity $Nb^3$, referred to herein as the "Microcrack Parameter," provides another useful means to quantify the degree of microcracking in a ceramic body. For a non-microcracked body, the value of $Nb^3$ is 0.00. In the example in FIG. 2, the value of $Nb^3$ is 0.184. In embodiments, it is therefore preferred that the value of $Nb^3$ be $\leq 0.08$. In embodiments, it is more preferred for the ceramic honeycomb bodies to exhibit microcrack parameters of $Nb^3 \leq 0.07$, $Nb^3 \leq 0.06$, $Nb^3 \leq 0.05$, $Nb^3 \leq 0.04$, $Nb^3 \leq 0.03$, or even $Nb^3 \leq 0.02$.

In preferred embodiments, the cordierite honeycomb body comprises a porosity of at least 55%, a median pore diameter of not more than 5 microns, and a predicted thermal shock limit, TSL, of at least 1100° C., and more preferably at least 1200° C. In these embodiments, the ceramic honeycomb body further exhibits at least one of 1) a value of $E_{900° C.}/E_{25° C.}$ that is not more than about 0.95; 2) a value of the Microcrack Parameter, $Nb^3$, of not more than 0.02; and 3) a value of $\Delta CTE_{mc}$ ($I_T$) or $\Delta CTE_{mc}$ ($I_A$) that is not more than $2.0 \times 10^{-7}/°$ C. Such an exemplary honeycomb body is well suited for use as a low-mass catalytic converter substrate.

In other preferred embodiments, the ceramic honeycomb body has a porosity of at least 55%, a median pore diameter in the range of from 5 microns to 10 microns, and a predicted thermal shock limit, TSL, of at least 1100° C., and more preferably at least 1200° C., and even more preferably at least 1300° C., and further exhibits at least one of 1) a value of $E_{900° C.}/E_{25° C.}$ that is not more than about 0.95; 2) a value of the Microcrack Parameter, $Nb^3$, of not more than 0.02; and 3) a value of $\Delta CTE_{mc}$ ($I_T$) or $\Delta CTE_{mc}$ ($I_A$) is not more than $2.0 \times 10^7/°$ C. Such ceramic honeycomb bodies are well suited for use as diesel particulate filters for very high filtration efficiency applications.

Figure 3:
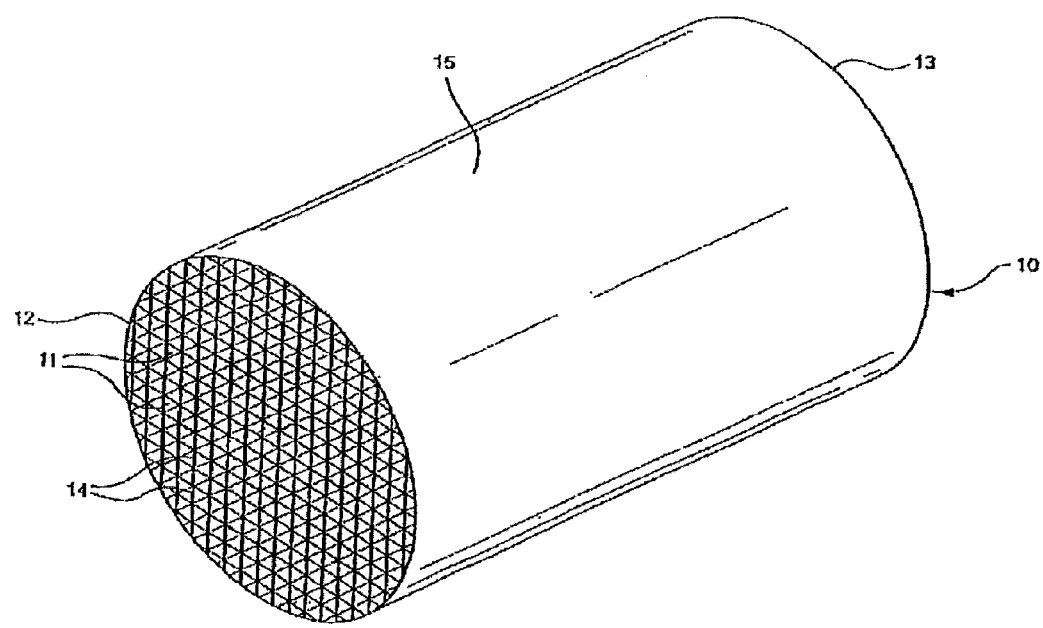
FIG. 3 is an isometric view of porous honeycomb substrate.
Figure 4:
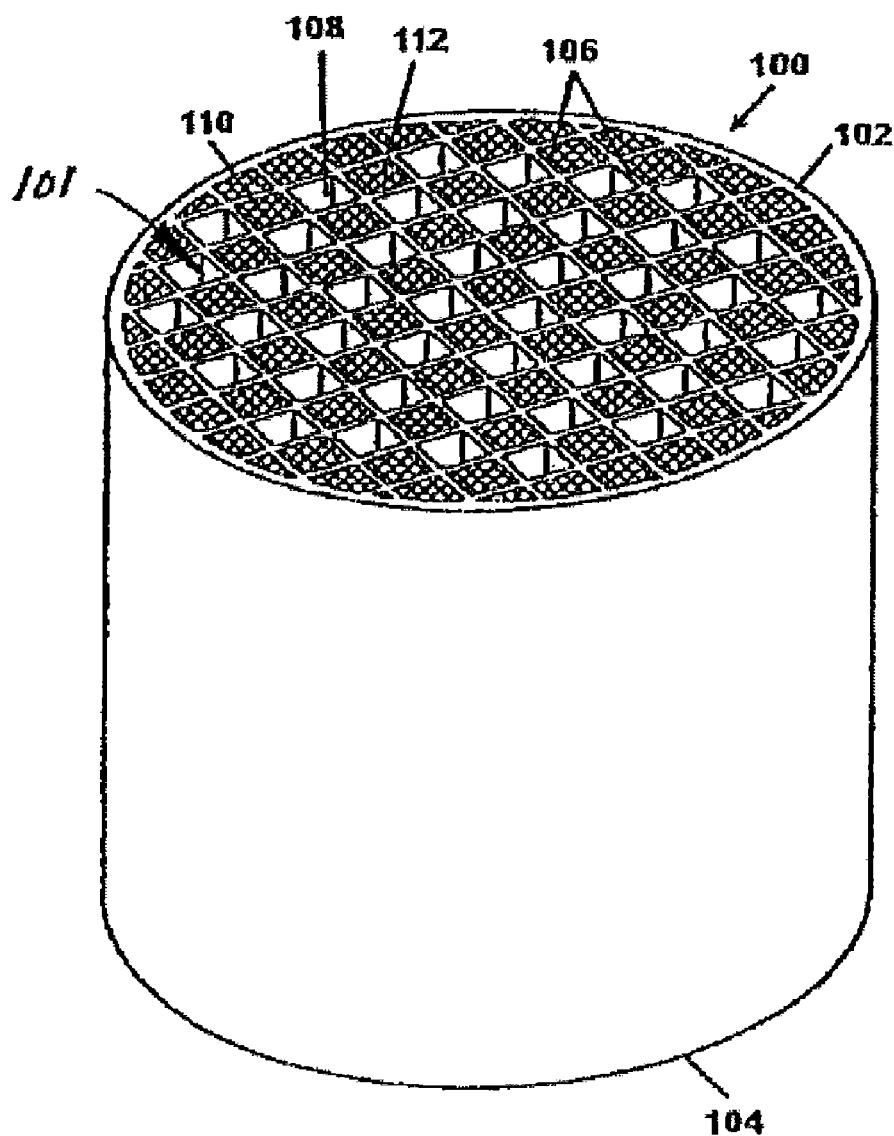
FIG. 4 is an isometric view of porous honeycomb filter.

The bodies can be porous cordierite ceramic honeycomb bodies having a plurality of cell channels extending between a first and second end as shown in FIGS. 3 and 4, for example. The ceramic honeycomb body may have a honeycomb structure that may be suitable for use as, for example, flow-through catalyst substrates or wall-flow exhaust gas particulate filters, such as diesel particulate filters. A typical porous ceramic honeycomb flow-through substrate article 10 according to embodiments of the disclosure is shown in FIG. 3 and includes a plurality of generally parallel cell channels 11 formed by and at least partially defined by intersecting cell walls 14 (otherwise referred to as "webs") that extend from a first end 12 to a second end 13. The channels 11 are unplugged and flow through them is straight down the channel from first end 12 to second end 13. Preferably, the honeycomb article 10 also includes an extruded smooth skin 15 formed about the honeycomb structure, although this is optional and may be formed in later processing as an after applied skin. In embodiments, the wall thickness of each cell wall 14 for the substrate can be, for example, between about 0.002 to about 0.010 inches (about 51 to about 254 µm). The cell density can be, for example from about 300 to about 900 cells per square inch (cpsi). In a preferred implementation, the cellular honeycomb structure can consist of multiplicity of parallel cell channels 11 of generally square cross section formed into a honeycomb structure. Alternatively, other cross-sectional configurations may be used in the honeycomb structure as well, including rectangular, round, oblong, triangular, octagonal, hexagonal, or combinations thereof. "Honeycomb" refers to a connected structure of longitudinally-extending cells formed of cell walls, having a generally repeating pattern therein.

FIG. 4 illustrates a honeycomb filter 100 in embodiments of the disclosure. The general structure is the same as the flow-through substrate, including a body 101 made of intersecting porous ceramic walls 106 extending from the first end 102 to the second end 104. Certain cells are designated as inlet cells 108 and certain other cells are designated as outlet cells 110. In the filter 100, certain selected channels include plugs 112. Generally, the plugs are arranged at the ends of the channels and in some defined pattern, such as the checkerboard patterns shown. The inlet channels 108 may be plugged at the outlet end 104 and the outlet channels 110 may be plugged at the inlet end 102. Other plugging patterns may be employed and all of the outermost peripheral cells may be plugged (as shown) for additional strength. Alternately, some of the cells may be plugged other than at the ends. In embodiments, some channels can be flow-through channels and some can be plugged providing a so-called partial filtration design. In embodiments, the wall thickness of each cell wall 14 for the filter can be for example from about 0.006 to about 0.030 inches (about 152 to about 762 µm). The cell density can be for example between 100 and 400 cells per square inch (cpsi).

References to cordierite ceramic bodies or honeycombs refer to cordierite composition comprised predominately of $Mg_2Al_4Si_5O_{18}$. However, the cordierite bodies can also contain compositions of similar physical properties, for example, "stuffed" cordierite compositions. Stuffed cordierites are cordierites having molecules or elements such as $H_2O$, $CO_2$, Li, K, Na, Rb, Cs, Ca, Sr, Ba, Y, or a lanthanide element in the channel site of the cordierite crystal lattice. Such constituents can impart modified properties, such as improved sinterability or reduced lattice thermal expansion or thermal expansion anisotropy, that may be useful for some applications. Also included are cordierites having chemical substitutions of, for example, Fe, Mn, Co, Ni, Zn, Ga, Ge, or like elements, for the basic cordierite constituents to provide, for example, improved sinterability, color, electrical properties, catalytic properties, or like properties. The symmetry of the crystal lattice of the cordierite phase can be, for example, orthorhombic, hexagonal, or any mixture of phases having these two symmetries.

In embodiments, the disclosure also provides a method for making the porous cordierite ceramic honeycomb structures described above, where a plasticized ceramic forming precursor batch composition is provided by compounding an inorganic powder batch mixture together with at least one glass forming metal oxide source; an organic binder; and a liquid vehicle. The plasticized batch can further comprise one or more optional constituents including pore-forming agents, plasticizers, and lubricants. The plasticized batch is then formed by shaping, such as by extrusion, into a green honeycomb. These green honeycombs are then dried, such as by microwave or RF drying, and fired in a kiln to sinter or reaction-sinter the inorganic raw material sources into unitary cordierite ceramic honeycomb bodies. The green bodies are fired for a time and at a temperature sufficient to provide a sintered cordierite honeycomb including relatively low microcracking and relatively high thermal shock resistance.

The inorganic powder batch can comprise a mixture of raw cordierite forming components that can be heated under conditions effective to provide a primary sintered phase cordierite composition. The raw cordierite forming batch components can include, for example, a magnesium oxide source; an alumina source; and a silica source. As an example the inorganic ceramic powder batch composition can be selected to provide a cordierite composition consisting essentially of from about 49 to about 53 percent by weight $SiO_2$, from about 33 to about 38 percent by weight $Al_2O_3$, and from about 12 to about 16 percent by weight MgO.

Exemplary magnesium oxide sources can include talc. In a further embodiment, suitable talcs can comprise talc having a median particle size less than about 15 μm, or even less than about 10 μm. Particle size is measured by, for example, a laser diffraction technique, such as by a Microtrac® particle size analyzer. Examples of commercially available magnesium oxide sources suitable for use in the present disclosure include, Artic Mist Talc, available from Luzenac, Inc. of Oakville, Ontario, Canada, and 96-67 Talc available from Barrett's Minerals, Inc. of Dillon, Mont.

Exemplary alumina sources include alumina forming sources, which are chemical compounds capable of forming aluminum oxide upon heating. Alumina forming sources include corundum or alpha-alumina, gamma-alumina, transitional aluminas, aluminum hydroxide such as gibbsite and bayerite, boehmite, diaspore, aluminum isopropoxide and the like. The median particle size of the alumina source is preferably less than 8 μm, including for example, median particle sizes less than 7 μm, less than 6 μm, less than 5, less than 4, less than 3, less than 2, or even less than 1 μm. Commercially available alumina sources can include relatively coarse aluminas, such as the Alcan C-700 series, having a particle size of about 4-7 microns, and a specific surface area of about 0.5-1 $m^2/g$, e.g., C-701™ and relatively fine aluminas having a particle size of about 0.5-4 microns, such as A1000 SGD and A3000 available from Almatis.

If desired, the alumina source can include a dispersible alumina forming source. A dispersible alumina forming source can be an alumina forming source that is at least substantially dispersible in a solvent or liquid medium and that can be used to provide a colloidal suspension in a solvent or liquid medium. In embodiments, a dispersible alumina source can be a relatively high surface area alumina source having a specific surface area of at least 20 $m^2/g$. Alternatively, a dispersible alumina source can have a specific surface area of at least 50 $m^2/g$. In an exemplary embodiment, a suitable dispersible alumina source for use in the methods of the disclosure includes alpha aluminum oxide hydroxide ($AlOOH.xH_2O$) commonly referred to as boehmite, pseudo-boehmite, and as aluminum monohydrate. In exemplary embodiments, the dispersible alumina source can include the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina sources that can be used in the disclosure include Dispal 18N4-80, commercially available from Sasol North America.

Suitable silica sources can include, for example, a clay or clays, such as raw kaolin, calcined kaolin, or mixtures thereof. In embodiments, the silica source can preferably have a median particle diameter less than 15 microns, or even more preferably less than 10 microns. Exemplary clays include, for example, non-delaminated kaolin raw clay, having a particle size of about 7-9 microns, and a surface area of about 5-7 $m^2/g$, such as Hydrite MP™ and those having a particle size of about 2-5 microns, and a surface area of about 10-14 $m^2/g$, such as Hydrite PX™ and delaminated kaolin having a particle size of about 1-3 microns, and a surface area of about 13-17 $m^2/g$, such as KAOPAQUE-10™ or calcined clay, having a median particle size of about 1-3 microns, and a surface area of about 6-8 $m^2/g$, such as Glomax LL. All of the above named materials are available from Imerys Minerals, Ltd. In embodiments of the disclosure, when kaolin or calcined kaolin is present in the plasticized batch composition, the amount having a median particle diameter less than about 7 microns is preferably less than about 5 percent by weight of the inorganic raw materials, and is more preferably at least substantially absent from the batch composition. It is further preferred that the raw material mixture is absent of any kaolin or calcined kaolin.

In embodiments, the raw material mixture contains a silica forming source, by which is meant a material comprising >95% $SiO_2$ or capable of converting to >95% $SiO_2$ during heating. The silica forming source can further include crystalline silica such as quartz or cristobalite, non-crystalline silica such as fused silica or sol-gel silica, silicone resin, zeolite, diatomaceous silica, and like materials. A commercially available quartz silica forming source can include, for example, Imsil A25 Silica available from Unimin Corporation. In embodiments, the silica forming source can include a compound that forms free silica when heated, such as for example, silicic acid or a silicon organo-metallic compound.

In addition to the raw cordierite forming batch components above, the inorganic powder batch composition can also comprise one or more pre-reacted cordierite powders or synthesized magnesium alumino-silicate glass powders. When cordierite powders or synthesized magnesium alumino-silicate glass powders are selected for use in the batch, the particles preferably have a median particle diameter of not more than 30 microns and a value of $(D_{90}-D_{10})/D_{50}$ of not more than 1.20. The values of $D_{10}$, $D_{50}$ (median particle diameter), and $D_{90}$ are the particle diameters of the powder at 10%, 50%, and 90% of the particle size distribution, based upon particle volume, as measured by a laser diffraction technique.

Suitable pre-reacted cordierite compositions for use in the inorganic powder batch can be obtained commercially from known sources, including for example, Corning Incorporated, Corning, N.Y., USA. Alternatively, a suitable cordierite composition can also be manufactured by heating a cordierite forming batch composition, as described above, under conditions effective to convert the batch composition into a sintered phase cordierite. In embodiments, a suitable pre-reacted cordierite consists essentially of from about 49 to about 53 percent by weight $SiO_2$, from about 33 to about 38 percent by weight $Al_2O_3$, and from about 12 to about 16 percent by weight MgO. For example, cordierite powders suitable for the intended purpose can be obtained, for example, by the complete or partial pre-reaction of inorganic precursor materials, including mineral combinations such as clay+talc+alumina, spinel+silica, magnesia+alumina+silica, etc., or by the partial or complete devitrification (crystallization) of a magnesium alumino-silicate glass frit; or by the partial or complete crystallization of a chemically precipitated magnesium aluminosilicate material, such as a sol-gel powder. Alternatively naturally occurring cordierites, ground to suitable particle sizes, can be used.

When the cordierite powder is prepared by reacting inorganic mineral raw materials or chemically precipitated materials, it may be formed, for example, by fabricating a mass of the mixed precursors or chemical precipitates, heating the mass to a temperature sufficient to form cordierite, and then crushing the mass to the desired particle size with optional sieving or air classification. Alternatively, the raw materials or precipitates could also be pre-powdered by spheroidizing, such as by spray drying or other atomization method, and the resulting granules heated to temperatures effective to form cordierite. When the cordierite powder is prepared from a glass precursor, the molten glass may be formed into a convenient shape and crushed, or it may be "drigaged" by pouring the molten glass into a quenching liquid such as water. The resulting glass feeds may then be ground to a desired particle size with optional sieving or air classification to select an appropriately necessary particle size range.

In embodiments, the raw material mixture may further include at least one glass forming metal oxide source. The glass forming metal oxide source can be a colloidal metal oxide source that is capable of forming a colloidal suspension in a solvent and preferably contains 0 to 97 wt % $SiO_2$, 0 to 97% MgO, 0 to 97% $Al_2O_3$, and at least 3.0 wt. % of one or more metal oxides selected from the group comprising $Li_2O$, $Na_2O$, $K_2O$, CaO, $Fe_2O_3$, and $TiO_2$. The metal oxides can include, for example, at least 4%, at least 5%, or even at least 6 wt. % of the colloidal metal oxide source. In embodiments, the colloidal metal oxide source can include, for example, a colloidal silicate phase containing at least 50 wt % $SiO_2$ when the chemical formula is calculated on an anhydrous basis. The colloidal silicate can be a colloidal phyllosilicate, such as attapulgite or bentonite clay. Still further, in preferred embodiments, the glass forming metal oxide source can include a rare earth element such as yttrium or lanthanum.

Other components that can be present in the batch compositions in relatively minor proportions include, for example, oxides of impurity elements or intentional dopants such as calcium, lithium, iron, titanium, sodium, potassium, boron, tungsten, bismuth, and like elements. The ratio of magnesia, alumina, and silica components in the bulk raw material mixture can be chosen to form only stoichiometric cordierite, or may be selected to allow the formation of some spinel, sapphirine, mullite, forsterite, enstatite, or a glass phase. In some embodiments, it is preferred that the sum of $Li+CaO+Na_2O+K_2O+$ and any rare earth oxide be at least 0.5 wt %.

The batch composition can include a pore-forming agent. The pore-forming agent can include, for example, greater than or equal to 30%, 40%, 50%, or even 60% by weight, of the inorganic raw materials by superaddition. The pore-forming agents can include, for example, graphite, starch, or even combinations thereof. The starch can include, for example corn, rice, or potato starch. In an example where a combination of graphite and starch is employed, the pore-forming agents can include, for example greater than or equal to 20% graphite and greater than or equal to 10% starch, as a superaddition based upon 100% weight of the inorganic raw materials. In embodiments of the disclosure, the pore former preferably has a median particle size diameter less than about 20 microns, less than about 15 microns, or even less than about 10 microns.

To provide the plasticized batch compositions of the disclosure, the inorganic powder batch composition, including the aforementioned powdered ceramic materials, the glass forming metal oxide source, and any pore former, can be compounded with a liquid vehicle, an organic binder, and one or more optional forming or processing aids. Exemplary processing aids or additives can include lubricants, surfactants, plasticizers, and sintering aids. Exemplary lubricants can include hydrocarbon oil, tall oil, or sodium stearate.

The organic binder component can include water soluble cellulose ether binders such as methylcellulose, hydroxypropyl methylcellulose, methylcellulose derivatives, or a combination thereof. Particularly preferred examples include methylcellulose and hydroxypropyl methylcellulose. Preferably, the organic binder can be present in the composition as a super addition in an amount in the range of from 0.1 weight percent to 8.0 weight percent of the inorganic powder batch composition, and more preferably, in an amount of from about 3 weight percent to about 6 weight percent of the inorganic powder batch composition. The incorporation of the organic binder into the batch composition can further contribute to the cohesion and plasticity of the composition. The improved cohesion and plasticity can, for example, improve the ability to shape the mixture into a honeycomb body.

A preferred liquid vehicle for providing a flowable or paste-like consistency to the inventive compositions is water, although other liquid vehicles exhibiting solvent action with respect to suitable temporary organic binders can be used. The amount of the liquid vehicle component can vary in order to impart optimum handling properties and compatibility with the other components in the ceramic batch mixture. Preferably, the liquid vehicle content is present as a super addition in an amount in the range of from 15% to 60% by weight of the inorganic powder batch composition, and more preferably in the range of from 20% to 40% by weight of the inorganic powder batch composition. Minimization of liquid components in the disclosed compositions can lead to further reductions in undesired drying shrinkage and crack formation during the drying process.

In exemplary preferred embodiments, a batch composition of the disclosure can include, for example, a mixture of a magnesium-containing source having a median particle diameter of not more than about 15 microns, an alumina-forming source having a median particle diameter of not more than about 8 microns, a silica-forming source having a median particle diameter of not more than about 15 microns, a pore-forming agent having a median particle diameter of not more than about 20 microns, and one or more metal oxide sources whose presence increases the amount of glass phase in the fired body whereby the total amount of $Li_2O+Na_2O+K_2O+CaO+$rare earth oxide in the fired body is at least about 0.5 weight percent. The glass-forming metal oxide source is preferably a compound of a rare earth element such as yttrium or lanthanum. Further, the amount of any kaolin or calcined kaolin having a median particle diameter less than about 7 microns is less than about 5 percent by weight of the inorganic raw materials, and is preferably absent from the batch.

In exemplary preferred embodiments, the batch composition can include, for example, a mixture of a magnesium-containing source having a median particle diameter of not more than about 15 microns, an alumina-forming source having a median particle diameter of not more than about 8 microns, a silica-forming source having a median particle diameter of not more than about 15 microns, a pore-forming agent having a median particle diameter of not more than about 20 microns, and one or more metal oxide sources whose presence increases the amount of glass phase in the fired body whereby the total amount of $Li_2O+Na_2O+K_2O+CaO$+rare earth oxide in the fired body is at least about 0.5 weight percent. The batch composition further comprises from about 0.001 to about 5 wt % of a pre-reacted cordierite source or a magnesium alumino-silicate glass source. Once again, the glass-forming metal oxide source is preferably a compound of a rare earth element such as yttrium, or lanthanum. Still further, the amount of kaolin or calcined kaolin having a median particle diameter less than about 7 microns is less than about 5 percent by weight of the inorganic raw materials, and is preferably absent from the batch.

In exemplary preferred embodiments, the batch composition comprises a mixture of about 5 to about 99 wt % of a pre-reacted cordierite source or a magnesium alumino-silicate glass source having a median particle diameter of not more than about 30 microns and a value of $(D_{90}-D_{10})/D_{50}$ of not more than about 1.20. The batch composition also comprises a pore-forming agent having a median particle diameter of not more than about 20 microns and one or more components having a median particle diameter of not more than about 10 microns selected from the group comprising a magnesia source, an alumina source, a silica source; and a metal oxide source whose presence increases the amount of glass phase in the fired body whereby the total amount of $Li_2O+Na_2O+K_2O+CaO$+rare earth oxide in the fired body is at least about 0.5 weight percent.

In preferred embodiments, the batch composition can include, for example, a mixture of talc having a median particle diameter of not more than about 10 microns, an alumina-forming source having a median particle diameter of not more than 8 microns, a silica-forming source having a median particle diameter of not more than about 10 microns, and from about 0.5 to about 3.0 weight percent of a $Y_2O_3$-forming source. Optionally, one or more pore-forming agents are also included having a median particle diameter of not more than about 15 microns and being present in a ratio of up to about 80 parts by weight pore-forming agent to about 100 parts by weight inorganic raw materials.

The honeycomb substrate such as that depicted in FIG. 3 can be formed from the plasticized batch according to any conventional process suitable for forming honeycomb monolith bodies. For example, in embodiments a plasticized batch composition can be shaped into a green body by any known conventional ceramic forming process, such as, e.g., extrusion, injection molding, slip casting, centrifugal casting, pressure casting, dry pressing, and the like. In embodiments, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The resulting honeycomb body can then be dried, and subsequently fired under conditions effective to convert the formed green composition into a primary sintered phase ceramic composition. Conditions effective for drying the formed green body functionally can include those conditions capable of removing at least substantially all of the liquid vehicle present within the green composition. As used herein, at least substantially all include the removal of at least about 95%, at least about 98%, at least about 99%, or even at least about 99.9% of the liquid vehicle present prior to drying. Exemplary and non-limiting drying conditions suitable for removing the liquid vehicle include heating the green honeycomb substrate at a temperature of at least about 50° C., at least about 60° C., at least about 70° C., at least about 80° C., at least about 90° C., at least about 100° C., at least about 110° C., at least about 120° C., at least about 130° C., at least about 140° C., or even at least about 150° C. for a period of time sufficient to at least substantially remove the liquid vehicle from the green composition. In embodiments, the conditions effective to at least substantially remove the liquid vehicle comprise heating the formed green body at a temperature of at least about 60° C. Further, the heating can be provided by any conventionally known method, including for example, hot air drying, RF, microwave drying, or a combination thereof.

With reference again to FIG. 4, either before or after the green body has been fired, a portion of the cells 110 of a formed monolithic honeycomb 100 can be plugged at the inlet end 102 with a paste having the same or similar composition to that of the body 101. The plugging is preferably performed only at the ends of the cells and form plugs 112 having a depth of about 5 to 20 mm, although this can vary. A portion of the cells on the outlet end 104 but not corresponding to those on the inlet end 102 may also be plugged in a similar pattern. Therefore, each cell is preferably plugged only at one end. The preferred arrangement is to therefore have every other cell on a given face plugged as in a checkered pattern as shown in FIG. 4. Further, the inlet and outlet channels can be any desired shape. However, in the exemplified embodiment shown in FIG. 4, the cell channels are square in cross-sectional shape.

The formed honeycomb bodies can then be fired under conditions effective to convert the inorganic powder batch composition into a primary sintered phase cordierite composition. Exemplary firing conditions can comprise heating the honeycomb green body at a maximum firing temperature in the range of from about 1340° C. to about 1435° C., and more preferably in the range of from about 1375° C. to about 1425° C., for a period of about 5 to about 30 hours.

EXAMPLES

To further illustrate the principles of the disclosure, the following examples provide those of ordinary skill in the art with a complete disclosure and description of how the cordierite honeycomb bodies and methods claimed herein are made and evaluated. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

The disclosure is illustrated by non-limiting examples in the following tables. Table 1 provides the sources and median particle diameters of the raw materials used in the examples as measured by a laser diffraction technique. Table 2 lists the parts by weight of the raw materials used to make the inventive examples. Table 3 provides the properties of inventive examples having substantial alignment of the cordierite crystal z-axes within the plane of the honeycomb wall. Table 4 lists the properties of inventive examples having nearly random cordierite crystal orientation within the plane of the honeycomb walls.

In preparing the examples, inorganic raw materials and pore formers were mixed with binders and lubricants, and water was added to the powder mixture in a stainless steel muller to form a plasticized batch. The batch was extruded as 2-inch diameter honeycomb having either approximately 300-325 cells/inch$^2$ and approximately 0.014-0.015-inch walls, or approximately 600 cells/inch$^2$ and approximately 0.004-inch walls. The extruded ware was dried and then fired in an electrically heated kiln at the temperatures and hold times listed in the tables. Heating rates were sufficient to prevent cracking of the ware and are well know in the art. In the Tables, the mean coefficients of thermal expansion, in units of $10^{-7}/°$ C., were measured by dilatometry on a specimen parallel to the lengths of the channels of the honeycomb article ("axial direction"). The % porosity is the volume percentage of porosity in the walls of the article as measured by mercury porosimetry. The terms $d_1$, $d_2$, $d_5$, $d_{10}$, $d_{25}$, $d_{50}$, $d_{75}$, $d_{90}$, $d_{95}$, $d_{98}$, and $d_{99}$ denote the pore diameters, in microns, or micrometers ($10^{-6}$ meters), at which 1%, 2%, 5%, 10%, 25%, 50%, 75%, 90%, 95%, 98%, and 99% of the total pore volume are of a finer pore diameter, respectively, also as measured by mercury porosimetry. Thus, for example, $d_{90}$ is the pore diameter at which 90% (by volume) of the pores have a smaller diameter (equal to the pore diameter at which the cumulative mercury intrusion volume equals 10% of the total mercury intrusion volume). It therefore follows that, for example, $d_{10} < d_{50} < d_{90}$.

Weight percentages of residual mullite, spinel+sapphirine, and alpha-alumina in the fired samples were measured by x-ray diffractometry. The amount of spinel and sapphirine are included together due to the potential difficulty in distinguishing between the two phases, depending upon the XRD technique used.

The axial XRD I-ratio and transverse XRD I-ratio are defined by EQ. 1 and were measured by x-ray diffractometry using copper Kα radiation. For randomly oriented cordierite crystals, the axial and transverse I-ratios are both equal to approximately 0.655.

All modulus of rupture (MOR), or flexural strength, values were measured by the four-point method on a cellular bar (½ inch×¼ inch×2.75 inches long) parallel to the axial direction of the honeycomb. MOR data in the tables typically represent the averaged measurements on four to six bars. Elastic modulus values were measured by a sonic resonance technique also on a cellular bar (1 inch×½ inch×5 inches long) parallel to the axial direction. The thermal shock parameter, TSP, was computed as described previously from $(MOR_{25° C.}/E_{25° C.})(CTE_{500-900° C.})^{-1}$, and thermal shock limit, TSL, is defined as TSP+500° C. Also computed were the thermal shock parameter, TSP*, defined as $(MOR_{25° C.}/E_{25° C.})(CTE_{200-1000° C.})$, and the thermal shock limit, TSL*, defined as TSP*+200° C. The value of TSL* is thus an estimate of the maximum temperature to which the cordierite body will survive without fracture when the coolest region of the body is at 200° C.

The closed frontal area, CFA, of the honeycomb is the area fraction of the face of the honeycomb comprised of the porous ceramic walls, and is computed as $wN\{2(N^{-0.5})-w\}$, where w is the wall thickness and N is the cell density (cells per unit area). The value of MOR/CFA is therefore an estimate of the MOR of the porous ceramic comprising the wall of the honeycomb.

TABLE 1

Raw material sources and median particle sizes

| Raw Material | Supplier | Product Code | $D_{50}$ (microns) |
|---|---|---|---|
| Talc A | Luzenac | Artic Mist | 5.0 |
| Talc B | Barretts Minerals | 96-67 | 14 |
| Alumina A | Almatis | A1000 SGD | 0.6 |
| Alumina B | Almatis | A3000 | 3.4 |
| Alumina C | Alcan | C701 | 6.8 |
| Boehmite | Sasol North America Inc. | Dispal 18N4-80 | 0.12 |
| Kaolin A | IMERYS Minerals Ltd. | Kaopaque K10 | 3.0 |
| Calcined Kaolin B | IMERYS Minerals Ltd. | Glomax LL | 3.0 |
| Quartz A | Unimin Corporation | Imsil A25 | 4.5 |
| Cordierite Powder A | Corning | — | 4.4 |
| Cordierite Powder B[1] | Corning | — | 23 |
| Yttrium Oxide | H. C. Starck, GmbH | Grade C | 0.8 |
| Magnesium Silicate Smectite Clay[2] | Southern Clay Products, Inc. | Laponite® RD | 0.025 |
| Attapulgite[3] | Active Minerals Co. LLC | Acti-Gel® 208 | 2.0 μ.m × 3 nm |
| Bentonite[4] | Wyo-Ben, Inc. | Big Horn® CH325 | −325 mesh |
| Graphite A | Asbury Carbons | 4602 | 35 |
| Graphite B | Asbury Carbons | 4014 | 9.3 |
| Graphite C | Asbury Carbons | Micro 450 | 5.8 |
| Rice Starch | American Key Food Products LLC | Remy Rice Starch | 7.1 |
| Corn Starch | National Starch & Chemical Co. | National® 465 | 16 |
| Methyl Cellulose | The Dow Chemical Co. | METHOCEL™ F240 | — |
| Hydrogenated Dimeric 1-Decene | Innovene USA LLC | Durasyn® 162 | — |
| Stearic Acid | Cognis Corp. | Emersol 120 | — |
| Sodium Stearate | Witco Corp. | — | — |
| Tall Oil Fatty Acid | S and S Chemical Co. | L-5 | — |

[1]$(D_{90} - D_{10})/D_{50} = 1.03$
[2]Contains approximately 3 wt % $Na_2O$ and 1 wt % $Li_2O$
[3]Contains approximately 3 wt % $Fe_2O_3$ and 1.9 wt % CaO
[4]Contains approximately 3.5 wt % $Fe_2O_3$, 2.3 wt % $Na_2O$, and 0.4 wt % CaO

TABLE 2

Batch compositions of inventive examples

| Batch Number | 1 | 2 | 3 | 4 | 5 | 6 | 7 | 8 | 9 | 10 |
|---|---|---|---|---|---|---|---|---|---|---|
| Talc A | 42.24 | 42.24 | 42.24 | 42.24 | 42.24 | 42.24 | 42.24 | 42.38 | 42.38 | — |
| Alumina A | — | — | 29.35 | 29.35 | — | 29.35 | 29.35 | — | — | — |
| Alumina B | — | 29.35 | — | — | — | — | — | — | — | — |
| Alumina C | 29.35 | — | — | — | 29.35 | — | — | 30.12 | 30.12 | — |
| Boehmite | 6.00 | 6.00 | 6.00 | 6.00 | 6.00 | 6.00 | 6.00 | 5.00 | 5.00 | 1.79 |
| Kaolin A | — | — | — | — | — | — | — | — | — | 3.94 |
| Quartz A | 22.41 | 22.41 | 22.41 | 22.41 | 22.41 | 22.41 | 22.41 | 23.50 | 23.50 | — |
| Cordierite Powder A | — | — | — | — | — | — | — | 1.00 | 1.00 | — |
| Cordierite Powder B | — | — | — | — | — | — | — | — | — | 90.00 |
| Yttrium Oxide | 1.00 | 1.00 | 1.00 | 1.00 | 1.00 | 1.00 | 1.00 | — | — | — |
| Mg Silicate Smectite Clay | — | — | — | — | — | — | — | — | — | 4.27 |
| Attapulgite | — | — | — | — | — | — | — | 5.00 | — | — |
| Bentonite | — | — | — | — | 5.00 | 5.00 | — | — | 5.00 | — |
| Graphite A | — | — | — | — | — | — | — | 45.00 | 45.00 | 15.00 |
| Graphite B | 45.00 | 45.00 | 45.00 | 20.00 | — | — | 35.00 | — | — | — |
| Graphite C | — | — | — | — | 45.00 | 45.00 | — | — | — | — |
| Rice Starch | 15.00 | 15.00 | 15.00 | 20.00 | 15.00 | 15.00 | 20.00 | — | — | — |
| Corn Starch | — | — | — | — | — | — | — | 15.00 | 15.00 | 10.00 |
| Methyl Cellulose | 5.00 | 5.00 | 5.00 | 6.00 | 5.00 | 5.00 | 6.00 | 6.00 | 6.00 | 8.00 |
| Durasyn 162 | 6.00 | 6.00 | 6.00 | 4.60 | 6.00 | 6.00 | 4.60 | — | — | — |
| Stearic Acid | 0.60 | 0.60 | 0.60 | — | 0.60 | 0.60 | — | — | — | — |
| Sodium Stearate | — | — | — | — | — | — | — | 1.00 | 1.00 | 1.00 |
| Tall Oil | — | — | — | 0.60 | — | — | 0.60 | — | — | — |

TABLE 3

Properties of examples having substantially non-random crystal orientation

| Example Number | 4.1 | 4.2 | 4.3 | 4.4 | 4.5 | 4.6 | 4.7 | 4.8 |
|---|---|---|---|---|---|---|---|---|
| Batch Number | 1 | 1 | 2 | 3 | 4 | 5 | 6 | 7 |
| Tmax (° C.) | 1380 | 1360 | 1380 | 1380 | 1380 | 1380 | 1380 | 1380 |
| Hold Time (hours) | 20 | 20 | 20 | 20 | 20 | 20 | 20 | 20 |
| Pore Volume (ml/g) | 0.7910 | 0.8097 | 0.7065 | 0.6534 | 0.5151 | 0.6466 | 0.5907 | 0.5958 |
| % Porosity | 66.8 | 65.8 | 62.6 | 60.1 | 56.9 | 62.0 | 60.8 | 59.7 |
| $d_1$ | 2.8 | 3.6 | 1.7 | 1.5 | 1.2 | 3.4 | 1.5 | 1.2 |
| $d_2$ | 3.6 | 4.3 | 2.2 | 1.7 | 1.4 | 4.1 | 1.8 | 1.5 |
| $d_5$ | 4.9 | 5.4 | 2.9 | 2.0 | 1.8 | 5.0 | 2.1 | 1.9 |
| $d_{10}$ | 6.0 | 6.4 | 3.4 | 2.3 | 2.0 | 5.9 | 2.3 | 2.2 |
| $d_{25}$ | 8.0 | 7.9 | 4.2 | 2.7 | 2.4 | 7.7 | 2.6 | 2.6 |
| $d_{50}$ | 10.0 | 9.4 | 5.2 | 3.1 | 2.7 | 9.3 | 3.0 | 3.0 |
| $d_{75}$ | 12.6 | 11.9 | 6.5 | 3.5 | 3.2 | 11.3 | 3.6 | 3.5 |
| $d_{90}$ | 30.8 | 35.6 | 11.6 | 4.7 | 4.7 | 21.3 | 5.0 | 4.8 |
| $d_{95}$ | 98.4 | 117.4 | 44.0 | 8.6 | 8.2 | 56.7 | 8.5 | 8.7 |
| $d_{98}$ | 204.1 | 206.7 | 155.2 | 18.8 | 14.0 | 142.1 | 17.6 | 16.1 |
| $d_{99}$ | 260.6 | 253.8 | 210.6 | 38.4 | 21.2 | 202.4 | 33.2 | 27.8 |
| $(d_{50} - d_{10})/d_{50} = d_f$ | 0.40 | 0.32 | 0.35 | 0.26 | 0.26 | 0.37 | 0.24 | 0.26 |
| $(d_{90} - d_{50})/d_{50} = d_c$ | 2.08 | 2.78 | 1.22 | 0.50 | 0.71 | 1.28 | 0.69 | 0.63 |
| $(d_{90} - d_{10})/d_{50} = d_b$ | 2.48 | 3.10 | 1.57 | 0.76 | 0.97 | 1.65 | 0.92 | 0.89 |
| CTE (25-800) $10^{-7}$/° C. | 13.0 | 12.5 | 13.2 | 12.0 | 12.0 | 13.2 | 12.5 | 10.8 |
| CTE (500-900) $10^{-7}$/° C. | 19.8 | 19.4 | 19.4 | 19.2 | 18.8 | 19.9 | 19.5 | 17.9 |
| CTE (200-1000) $10^{-7}$/° C. | 17.0 | 16.7 | 17.1 | 16.7 | 16.4 | 17.5 | 17.0 | 15.4 |
| $\Delta CTE_{mc}$ based on $I_T$ ($10^{-7}$/° C.) | 0.9 | 1.7 | 0.4 | 1.4 | 0.5 | 0.3 | 0.2 | 1.5 |
| $\Delta CTE_{mc}$ based on $I_A$ ($10^{-7}$/° C.) | 1.1 | 2.4 | 0.6 | 1.3 | −0.3 | 0.2 | 0.1 | 1.0 |
| Axial I-ratio, $I_A$ | 0.48 | 0.52 | 0.48 | 0.46 | 0.41 | 0.47 | 0.44 | 0.41 |
| Transverse I-ratio, $I_T$ | 0.82 | 0.80 | 0.82 | 0.83 | 0.86 | 0.82 | 0.85 | 0.87 |
| % Mullite | 0.8 | 0 | 0 | 0 | 0 | 0.6 | 0.9 | 0 |
| % Spinel + Sapphirine | 1.6 | 1.7 | 1.6 | 1.7 | 1.4 | 0.7 | 0.5 | 1.6 |
| % Alumina | 0 | 0 | 0 | 0 | 0 | 0 | 0 | 0 |
| Cell Density (inches$^{-2}$) | 600 | 600 | 600 | 600 | 600 | 600 | 600 | 600 |
| Wall Thickness ($10^{-3}$ inches) | 4 | 4 | 4 | 4 | 4 | 4 | 4 | 4 |
| Closed Frontal Area Fraction (CFA) | 0.186 | 0.186 | 0.186 | 0.186 | 0.186 | 0.186 | 0.186 | 0.186 |
| MOR (psi) | 197 | 145 | 297 | 409 | 410 | 431 | 442 | 330 |
| MORICFA (psi) | 1059 | 780 | 1597 | 2199 | 2202 | 2320 | 2376 | 1774 |
| E at 25° C. ($10^5$ psi) | 1.12 | 0.935 | 1.81 | 2.79 | 4.58 | 2.25 | 3.02 | 2.60 |
| E at 900° C. ($10^5$ psi) | 1.04 | 0.892 | 1.68 | 2.64 | — | — | — | — |
| E at 1000° C. ($10^5$ psi) | 0.948 | 0.812 | 1.54 | 2.42 | — | — | — | — |
| E(900° C.)/E(25° C.) | 0.93 | 0.95 | 0.93 | 0.95 | — | — | — | — |

TABLE 3-continued

Properties of examples having substantially non-random crystal orientation

| Example Number | 4.1 | 4.2 | 4.3 | 4.4 | 4.5 | 4.6 | 4.7 | 4.8 |
|---|---|---|---|---|---|---|---|---|
| Batch Number | 1 | 1 | 2 | 3 | 4 | 5 | 6 | 7 |
| $E(1000°\,C.)/E(25°\,C.)$ | 0.85 | 0.87 | 0.85 | 0.87 | — | — | — | — |
| Microcrack Parameter, $Nb^3$ | 0.008 | 0.015 | 0.014 | 0.017 | — | — | — | — |
| MOR/E | 0.176% | 0.156% | 0.164% | 0.147% | 0.089% | 0.192% | 0.146% | 0.127% |
| $TSP = (MOR/E)_{25°\,C.}(CTE_{500-900°\,C.})^{-1}$ | 889 | 801 | 844 | 762 | 475 | 966 | 750 | 708 |
| $TSL = TSP + 500$ | 1389 | 1301 | 1344 | 1262 | 975 | 1466 | 1250 | 1208 |
| $TSP* = (MOR/E)_{25°\,C.}(CTE_{200-1000°\,C.})^{-1}$ | 1034 | 934 | 957 | 880 | 547 | 1099 | 860 | 824 |
| $TSL* = TSP* + 200$ | 1234 | 1134 | 1157 | 1080 | 747 | 1299 | 1060 | 1024 |

TABLE 4

Properties of examples having near-random crystal orientation

| Example Number | 5.1 | 5.2 | 5.3 |
|---|---|---|---|
| Batch Number | 8 | 9 | 10 |
| Tmax (° C.) | 1380 | 1380 | 1340 |
| Hold Time (h) | 20 | 20 | 15 |
| Pore Volume (ml/g) | 0.5383 | 0.5471 | 0.4454 |
| % Porosity | 56.5 | 57.2 | 52.5 |
| $d_1$ | 1.0 | 1.4 | 1.6 |
| $d_2$ | 2.0 | 2.1 | 2.1 |
| $d_5$ | 3.5 | 3.4 | 3.1 |
| $d_{10}$ | 4.8 | 4.6 | 4.1 |
| $d_{25}$ | 6.9 | 6.5 | 6.2 |
| $d_{50}$ | 8.5 | 8.2 | 7.9 |
| $d_{75}$ | 9.6 | 9.3 | 9.2 |
| $d_{90}$ | 13.1 | 13.0 | 11.7 |
| $d_{95}$ | 49.7 | 49.0 | 26.0 |
| $d_{98}$ | 171.8 | 164.9 | 118.4 |
| $d_{99}$ | 229.3 | 221.0 | 205.6 |
| $(d_{50} - d_{10})/d_{50} = d_f$ | 0.43 | 0.44 | 0.48 |
| $(d_{90} - d_{50})/d_{50} = d_c$ | 0.54 | 0.59 | 0.48 |
| $(d_{90} - d_{10})/d_{50} = d_b$ | 0.97 | 1.03 | 0.95 |
| CTE, 25-800 ($10^{-7}/°\,C.$) | 14.5 | 14.7 | 15.8 |
| CTE, 500-900 ($10^{-7}/°\,C.$) | 21.0 | 22.1 | 22.4 |
| CTE, 200-1000 ($10^{-7}/°\,C.$) | 18.6 | 19.5 | 20.1 |
| $\Delta CTE_{mc}$ based on $I_T$ ($10^{-7}/°\,C.$) | 2.6 | 2.4 | 2.2 |
| $\Delta CTE_{mc}$ based on $I_A$ ($10^{-7}/°\,C.$) | 2.5 | 2.3 | 3.3 |
| Axial I-ratio, $I_A$ | 0.61 | 0.61 | 0.64 |
| Transverse I-ratio, $I_T$ | 0.68 | 0.68 | 0.66 |
| % Mullite | 0 | 0.5 | 1.2 |
| % Spinel + Sapphirine | 1.3 | 0.8 | 0.7 |
| % Alumina | 0 | 0 | 0 |
| Cell Density (inches$^{-2}$) | 325 | 325 | 300 |
| Wall Thickness ($10^{-3}$ inches) | 15 | 15 | 14 |
| Closed Frontal Area Fraction | 0.47 | 0.47 | 0.43 |
| MOR (psi) | 972 | 972 | 640 |
| MOR/CFA (psi) | 2068 | 2068 | 1488 |
| E at 25° C. ($10^5$ psi) | 9.04 | 9.33 | 6.29 |
| E at 900° C. ($10^5$ psi) | 8.39 | — | 6.34 |
| E at 1000° C. ($10^5$ psi) | 8.13 | — | 6.33 |
| $E(900°\,C.)/E(25°\,C.)$ | 0.928 | — | 1.008 |
| $E(1000°\,C.)/E(25°\,C.)$ | 0.899 | — | 1.006 |
| Microcrack Parameter, $Nb^3$ | 0.003 | — | 0.065 |
| MOR/E | 0.107% | 0.104% | 0.102% |
| $TSP = (MOR/E)_{25°\,C.}(CTE_{500-900°\,C.})^{-1}$ | 512 | 471 | 454 |
| $TSL = TSP + 500$ | 1012 | 971 | 954 |
| $TSP* = (MOR/E)_{25°\,C.}(CTE_{200-1000°\,C.})^{-1}$ | 579 | 534 | 507 |
| $TSL* = TSP* + 200$ | 779 | 734 | 707 |

The inventive examples in Table 3 illustrate honeycomb bodies made with fine talc, alumina, and fine silica raw materials with 1.0 wt % $Y_2O_3$ addition, with addition of pore-forming agents, and lacking a kaolin source. Such combinations yield a low degree of microcracking, high porosity, fine pore size, and a thermal shock parameter, TSP, of at least 450° C. Furthermore, the absence of a cordierite powder or magnesium alumino-silicate glass in the raw material mixture results in a ceramic body in which the cordierite crystallites exhibit a high degree of orientation with their z-axes parallel to the plane of the honeycomb wall, as indicated by the low values of the axial XRD I-ratio less than 0.60 and high values of the transverse XRD I-ratio greater than 0.70. Consequently, the $CTE_{25-800°\,C.}$ values range from only $10.8 \times 10^{-7}/°\,C.$ to $13.2 \times 10^{-7}/°\,C.$ The low degree of microcracking in Example 4.4 is illustrated by the near absence of hysteresis between the elastic modulus heating and cooling curves in FIG. 1. The benefit of a high porosity in providing high strain tolerance, $(MOR/E)_{25°\,C.}$, in the inventive examples is shown in FIG. 5.

The inventive Examples 5.1 and 5.2 of Table 4 demonstrate honeycomb bodies made with the addition of 1 wt % of a pre-reacted cordierite powder of fine particle size (4.4 microns) to mixtures of talc, alumina-forming sources, and quartz with pore-forming agents and impure colloidal clays that contribute one or more of sodium, calcium, and iron to the ceramic body to increase the amount of glass phase in the fired body. The use of a pre-reacted cordierite powder results in fired bodies that substantially lack preferred orientation of the cordierite crystallites and which exhibit an axial XRD I-ratio greater than 0.60 and a transverse XRD I-ratio less than 0.70 and a $CTE_{25-800°\,C.}$ of at least $14 \times 10^{-7}/°\,C.$ Examples 5.1 and 5.2 possess a low degree of microcracking, high porosity, fine pore size, and a thermal shock parameter, TSP, of at least 450° C. Example 5.3 was made from 90 wt % of a pre-reacted cordierite powder with addition of fine boehmite, kaolin, and a colloidal clay to serve as an inorganic binder phase, and pore-forming agents to increase porosity. The colloidal smectite clay also contributes sodium and lithium impurities to increase the amount of glass phase in the fired body. Because the particle size of the pre-reacted cordierite powder is finer than about 30 microns, the fired body possesses a low degree of microcracking. Also, because the particle size distribution of the cordierite powder is narrow as indicated by the value of $(D_{90}-D_{10})/D_{50} < 1.20$, and because the median particle diameters of the pore-forming agents are closely matched to that of the cordierite powder, the final pore size distribution is relatively narrow. The narrow pore size distribution and high porosity result in a ratio of MOR/E of about 0.10% and a TSP of 454° C.

Applicant has found that addition of a pore former to conventional raw material mixtures that contain a fine kaolin and lack a rare earth oxide addition or the addition of another glass-forming metal oxide source is sufficient to increase porosity, for example, to >50%, but does not produce a body having a low degree of microcracking and high strain tolerance.

The disclosure has been described with reference to various specific embodiments and techniques. However, many variations and modifications are possible while remaining within the spirit and scope of the disclosure.

What is claimed is:

1. A method for making a porous ceramic honeycomb body, the method comprising:
    providing a plasticized ceramic forming precursor batch composition, comprising:
        an inorganic powder batch composition comprising:
        an inorganic powder batch mixture comprising a magnesium source having a median particle size diameter $D_{50}$ less than or equal to 15 microns, an alumina forming source having a median particle size diameter $D_{50}$ less than or equal to 8 microns, and a silica forming source having a median particle size diameter $D_{50}$ less than or equal to 15 microns
        at least 0.5 wt % of at least one glass forming metal oxide source comprising an yttrium source, a lanthanum source, or a combination thereof;
        an organic binder;
        a pore-forming agent present in a sufficient amount to achieve a porosity of at least 50% in the resulting fired honeycomb body; and
        a liquid vehicle present as a super addition in an amount of from 15 to 60 wt % of the inorganic powder batch composition;
    forming a honeycomb green body from the precursor batch composition; and
    firing the honeycomb green body to form the porous ceramic honeycomb body comprising a primary cordierite ceramic phase having a median pore size diameter $d_{50}$ less than 7.9 microns; an elastic modulus ratio $E_{900°\ C.}/E_{25°\ C.}$ of not greater than 1.01; and a thermal shock parameter (TSP) of at least 450° C.; where TSP is $(MOR_{25°\ C.}/E_{25°\ C.})(CTE_{500\text{-}900°\ C.})^{-1}$, $MOR_{25°\ C.}/E_{25°\ C.}$ is at least $0.14\times10^{-2}$ (0.14%), $MOR_{25°\ C.}$ is the modulus of rupture strength at 25° C., $E_{25°\ C.}$ is the Young's elastic modulus at 25° C., $E_{900°\ C.}$ is the elastic modulus at 900° C. measured during heating, and $CTE_{500\text{-}900°\ C.}$ is the high temperature thermal expansion coefficient at from about 500° C. to 900° C. during heating.

2. The method of claim 1, wherein the pore-forming agent is a particulate material having a median particle size diameter $D_{50}$ less than or equal to 20 microns.

3. The method of claim 1, wherein the plasticized ceramic forming precursor batch composition, comprises:
    an inorganic powder batch mixture comprising talc having a median particle size diameter $D_{50}$ less than or equal to 10 microns, an alumina forming source having a median particle size diameter $D_{50}$ less than or equal to 8 microns, and a silica forming source having a median particle size diameter $D_{50}$ less than or equal to 10 microns;
    at least 0.5 wt. % of a glass forming yttrium oxide source; and
    the pore forming agent having a median particle size diameter $D_{50}$ less than or equal to 15 microns.

* * * * *